United States Patent
Panda

(10) Patent No.: US 10,412,233 B2
(45) Date of Patent: Sep. 10, 2019

(54) METHODS FOR CONFIGURING SETTINGS FOR AN IMAGE FORMING APPARATUS WITH TEMPLATE SHEET

(71) Applicant: KYOCERA DOCUMENT SOLUTIONS INC., Osaka (JP)

(72) Inventor: Debashis Panda, Concord, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 15/904,891

(22) Filed: Feb. 26, 2018

(65) Prior Publication Data
US 2018/0191915 A1    Jul. 5, 2018

Related U.S. Application Data

(62) Division of application No. 15/195,117, filed on Jun. 28, 2016, now Pat. No. 9,942,418.

(51) Int. Cl.
| | |
|---|---|
| *H04N 1/00* | (2006.01) |
| *H04N 1/04* | (2006.01) |
| *H04N 1/32* | (2006.01) |
| *G06F 3/12* | (2006.01) |

(52) U.S. Cl.
CPC ....... *H04N 1/00002* (2013.01); *G06F 3/1204* (2013.01); *G06F 3/1205* (2013.01); *G06F 3/1231* (2013.01); *G06F 3/1257* (2013.01); *G06F 3/1258* (2013.01); *G06F 3/1286* (2013.01); *H04N 1/04* (2013.01); *H04N 1/32101* (2013.01); *H04N 2201/0094* (2013.01)

(58) Field of Classification Search
CPC .. H04N 1/00002; H04N 1/04; H04N 1/32101; H04N 2201/0094; G06F 3/1205; G06F 3/1231; G06F 3/1286
USPC ........................................................ 358/1.15
See application file for complete search history.

(56) References Cited

U.S. PATENT DOCUMENTS

| | | | | |
|---|---|---|---|---|
| 6,669,085 | B1 * | 12/2003 | Bergen ................ | H04N 1/00 235/375 |
| 2004/0114157 | A1 * | 6/2004 | Linder ............... | H04N 1/00002 358/1.9 |
| 2005/0162686 | A1 | 7/2005 | Barrus | |

(Continued)

FOREIGN PATENT DOCUMENTS

JP    06015911    1/1994

OTHER PUBLICATIONS

English Abstract of JP-06-015911, Publication Date: Jan. 25, 1994.

*Primary Examiner* — Neil R McLean
(74) *Attorney, Agent, or Firm* — Millen, White, Zelano & Branigan, P.C.; William Nixon

(57) ABSTRACT

An image forming apparatus prints a template sheet. The template sheet includes a graphical code and operation boxes. The graphical code includes information corresponding to a storage location address that stores information about settings for one or more image forming apparatuses. A user indicates what information is desired or to be changed on the image forming apparatus, marks it on the template sheet and scans the template sheet. Based on the instructions on the template sheet, information for settings is retrieved for an apparatus in a network. Maintenance information for the image forming apparatus also is retrieved using the template sheet and operation boxes.

7 Claims, 15 Drawing Sheets

(56) References Cited

U.S. PATENT DOCUMENTS

2005/0175240 A1* 8/2005 Parry .................... G03G 15/50
            382/182
2006/0256367 A1* 11/2006 Wei .................... H04N 1/00127
            358/1.15
2014/0285838 A1   9/2014 Bettineski et al.

* cited by examiner

METHODS FOR CONFIGURING SETTINGS FOR AN IMAGE FORMING APPARATUS WITH TEMPLATE SHEET

FIELD OF THE INVENTION

The present invention relates to the configuration of settings within an image forming apparatus. More specifically, the present invention relates retrieving the settings for the image forming apparatus based on graphical codes and information on a template sheet. The present invention also relates to performing operations on the image forming apparatus using a template sheet.

DESCRIPTION OF THE RELATED ART

A large number of different image forming apparatuses may be used in an office environment for printing, copying, scanning, and the like. Each apparatus, or device, may include its own settings as well as settings for specific users. Further, the apparatuses are connected to each other via a network. A user may send jobs or tasks to a variety of image forming apparatuses as opposed to being connected to only one device. Users in the typical office environment, however, may experience problems when they intend to use more than one image forming apparatuses with the same settings.

A change in the settings may involve going back and forth from the user's computer to change settings at the different apparatuses. This approach is time consuming. Alternatively, the user may have to use an operation panel at the image forming apparatus to input the settings before every task, which also is time consuming. The user also may not remember the exact or preferred settings. A user also may need information about the apparatus but does not have ready access to a computer to retrieve such information or change settings for a specific task.

SUMMARY OF THE INVENTION

A method for configuring settings for an image forming apparatus over a network is disclosed. The method includes printing a template sheet having a graphical code and at least one operation box. The graphical code indicates a storage location address within the network that stores setting information for a source image forming apparatus. The method also includes scanning the template sheet at a target image forming apparatus. The method also includes retrieving the setting information associated with the graphical code from the storage location address. The method also includes cloning the setting information to the target image forming apparatus according to a checked operation box of the at least one operation box.

A method for configuring settings for an image forming apparatus within a network is disclosed. The method includes storing current setting information for the image forming apparatus at a server. The method also includes changing a setting for the image forming apparatus. The method also includes printing a template sheet having a graphical code. The graphical code indicates a storage location address for the current setting information. The method also includes scanning the template sheet. The method also includes retrieving the current printer setting information associated with the graphical code from the storage location address at the server. The method also includes configuring the image forming apparatus according to the retrieved current printer setting information.

A method for retrieving maintenance information about an image forming apparatus is disclosed. The method includes printing a template sheet for the image forming apparatus. The template sheet includes a graphical code and at least one operation box related to items within the image forming apparatus. The method also includes scanning the template sheet at the image forming apparatus. The method also includes retrieving maintenance information about the items of the image forming apparatus according to the graphical code and a checked operation box of the at least one operation box. The method also includes printing a maintenance report for the image forming apparatus, wherein the maintenance report includes the maintenance information.

A method for configuring a scan setting at an image forming apparatus is disclosed. The method includes retrieving the scan setting at the image forming apparatus. The method also includes scanning a template sheet having a graphical code and an operation box related to the scan setting. The method also includes identifying that the operation has been marked. The method also includes applying the scan setting to the image forming apparatus. The method also includes scanning a document using the scan setting.

A method for configuring a print setting at an image forming apparatus is disclosed. The method includes scanning a template sheet having a graphical code and an operation box related to the print setting. The method also includes retrieving the print setting at the image forming apparatus. The method also includes identifying that the operation box has been marked. The method also includes applying the print setting to the image forming apparatus. The method also includes printing a document using the print setting.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
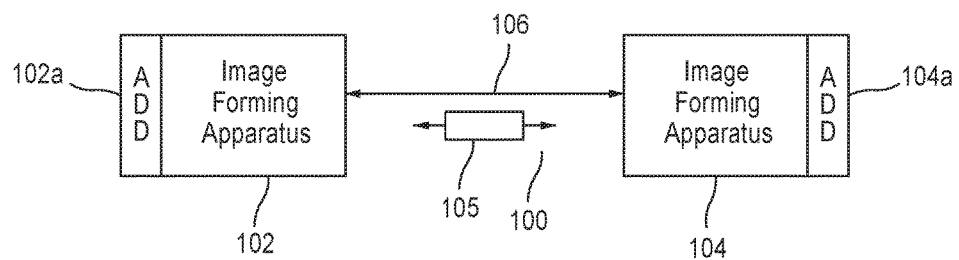
FIG. 1 illustrates a system having a source image forming apparatus and a target image forming apparatus according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments enable a user to clone setting configurations from a source image forming apparatus to a target imaging forming apparatus within an image forming system. An example image forming system may include two or more image forming apparatuses. A setting configuration, or settings, for one image forming apparatus is cloned to another image forming apparatus in the same local network. In other example embodiments, the setting configuration for one image forming apparatus is cloned to another image forming apparatus in a different local network. In this example, a server may be used between the local networks, such as a cloud server.

The image forming apparatus may receive a template sheet for performing the clone settings operations. The template includes a graphical code, such as a barcode, a matrix barcode, or a quick response (QR) code, as well as operation boxes. The target image forming apparatus scans the template sheet, which instructs this image forming apparatus how to act within the network. The graphical code may direct the target image forming apparatus to a memory storage location address on the network to retrieve the settings. The disclosed embodiments apply the retrieved settings to the target image forming apparatus.

The graphical code may add a security feature. If a user prints the template sheet, then the graphical code provides the user a specified window in which the target image forming apparatus can scan the template sheet and connect to the source image forming apparatus or memory storage to retrieve the settings. In some embodiments, the window may be 10 minutes. The window provides a security feature similar to the wi-fi protected setup (WPS) in wireless routers.

The user may initiate the setting retrieval operations through an operation panel screen on the target image forming apparatus. An instruction is given to scan the template sheet through the operation panel so that the image forming apparatus will expect the document. Once scanned, the appropriate information is gleaned from the sheet to perform the setting retrieval operations. Another function may be registering the template sheet with the image forming apparatus.

According to the disclosed embodiments, settings may be cloned between two image forming apparatuses. The cloning operations may occur between two image forming apparatuses in the same local network. Alternatively, the cloning operations may occur between image forming apparatuses in different local networks using a server.

The disclosed embodiments also include processes to operate an image forming apparatus with a template sheet that can be used for other scenarios. One operation may be the backup of setting configurations with a cloud server in the network. Another operation may be backing up or restoring settings using a printed template sheet. The disclosed embodiments also may use a process to retrieve and print a maintenance report corresponding to the image forming apparatus. Scanner and printer settings also may be set using the template sheet.

FIG. 1 depicts a system 100 having a source image forming apparatus 102 and a target image forming apparatus 104 according to the disclosed embodiments. The apparatuses are connected over a network 106. System 100 also includes additional image forming apparatuses that are connected to each other. The apparatuses may exchange information over network 106, such as data file 105. Data file 105 may refer to any data in electronic form. For example, data file 105 may be a document. Alternatively, data file 105 may be settings for a device within network 106.

An image forming apparatus, as disclosed herein, includes integrated components that perform a plurality of functions, such as a scanner, a printer, a facsimile machine, a copier, and a file transmission machine. The configuration of a disclosed image forming apparatus is disclosed in greater detail by FIG. 3 below. Each apparatus, however, also includes a network interface capable of connecting to network 106 to exchange data. A representative image forming apparatus also includes a computer and display to interact with a user. Further, the image forming apparatus may be a multifunction peripheral device or a single function peripheral device. In other words, image forming apparatuses 102 and 104 may perform many different functions, such as printing, scanning, copying, and the like.

Each image forming apparatus in system 100 also includes an address that uniquely identifies the specific apparatus within network 106. Network 106 may be a local area network (LAN) and the addresses used by the image forming apparatuses within the network may be internet protocol (IP) addresses. Thus, source image forming apparatus 102 has an IP address 102a and target image forming apparatus 104 has an IP address 104a. Each image forming apparatus also may have a unique identification number that is not an IP address. Thus, use of the term "address" in the present specification refers to a unique identifier or IP address for that specific image forming apparatus on a network.

System 100 allows target image forming apparatus 104 to clone settings from source image forming apparatus 102. Target image forming apparatus 104 performs an operation, such as scanning a template sheet with specific information to direct the target image forming apparatus to retrieve information on the settings from the source image forming apparatus. Preferably, as network 106 is a LAN network, the retrieval may occur in a timely manner. In this manner, a user does not need to go to source image forming apparatus 102 and copy the settings by hand or try to forward them to target image forming apparatus 104. This process also removes the need for the user to configure settings for target image forming apparatus 104 from a computer. Such a task may be time consuming and confusing. Instead, the template sheet directs the target image forming apparatus to the source image forming apparatus for the desired settings.

Figure 2:
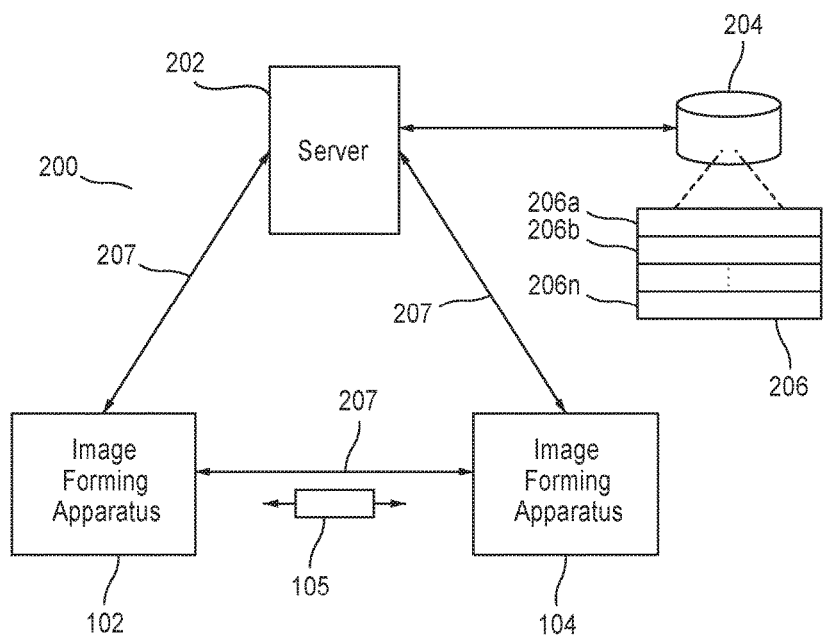
FIG. 2 illustrates another system having a source image forming apparatus and a target image forming apparatus according to the disclosed embodiments.

FIG. 2 depicts another system 200 having source image forming apparatus 102 and target image forming apparatus 104 according to the disclosed embodiments. System 200 may differ from system 100 in that the image forming apparatuses are in different local area networks. A wide area network (WAN) 206 may connect the LANs so that information is exchanged between devices within the different networks.

System 200 also includes a server 202 that is connected to source image forming apparatus 102 and target image forming apparatus 104. In some embodiments, server 202 may be a cloud server. Server 202 includes, or has access to, a database 204. Database 204 may store setting configuration information for the image forming apparatuses within system 200. Database 204 includes memory storage locations 206. Data is stored in these locations using memory storage location addresses 206a, 206b, and the like. As shown, numerous memory locations are used to store the settings for the apparatuses. For example, storage location address 206a may store settings for source image forming apparatus 102 while storage location address 206b stores settings for target image forming apparatus 104. Alternatively, storage location addresses 206a and 206b may store different settings for source image forming apparatus 102. The different settings may apply to different users of source image forming apparatus 102 or to different jobs performed by the apparatus. Thus, many different types of settings for a plurality of apparatuses in system 200 may be stored in database 204.

To retrieve settings using system 200, target image forming apparatus 104 performs an operation, such as scanning a template sheet that directs the apparatus to a storage location address 206 that has the settings for source image forming apparatus 102. The processes for directing the apparatus to the storage location address 206 are disclosed in greater detail below. Graphical information on the template sheet provides the data needed to determine the storage location address 206. Source image forming apparatus 102 is directly accessed. Source image forming apparatus stores the settings at the storage location address for use within system 200. This process is disclosed in greater detail below.

System 200 allows a user to travel to different locations connected by WAN 207 and access the appropriate settings as needed. If the user is Los Angeles to visit an office within the company using WAN 207 and wishes to clone the settings from source image forming apparatus 102 located in San Francisco, then the user may perform the disclosed processes without having to remotely access the source apparatus or have someone forward the settings. Further, the user does not have to manually input the settings into target image forming apparatus 104.

Figure 3:
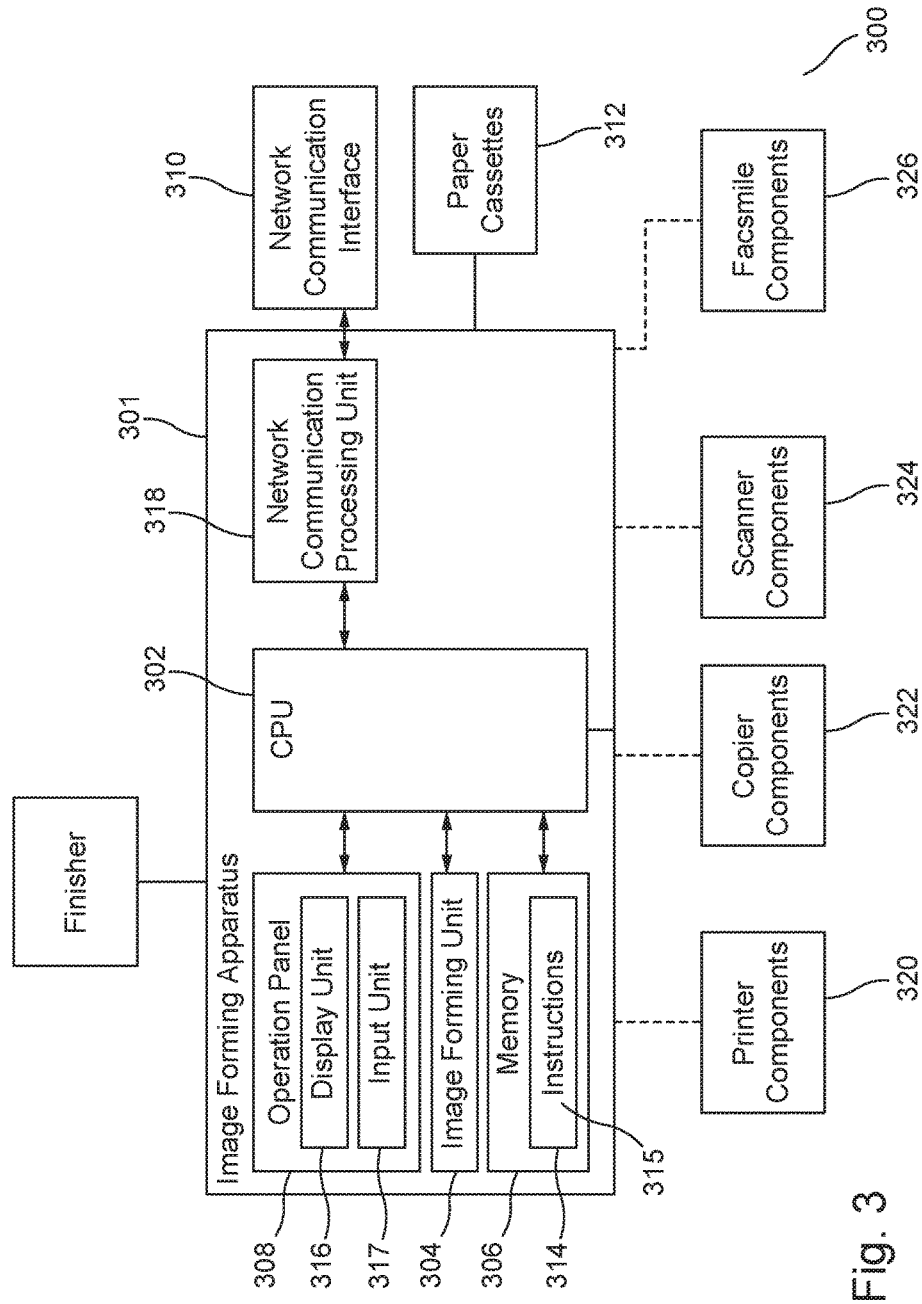
FIG. 3 illustrates a block diagram of a computer architecture for an image forming apparatus according to the disclosed embodiments.

FIG. 3 depicts a block diagram of an image forming apparatus 300 according to the disclosed embodiments. The architecture shown in FIG. 3 may apply to any image forming apparatus 300 used in systems 100 and 200, such as source image forming apparatus 102 and target image forming apparatus 104. For the disclosure of FIG. 3, image forming apparatus 300 will be described, even though the disclosed architecture may apply to any apparatus used in systems 100 and 200.

Image forming apparatus 300 includes a computing platform 301 that performs operations. Computing platform 301 includes a computer processing unit (CPU) 302, an image forming unit 304, a memory unit 306, an operation panel 308, and a network communication interface 310. Other components may be included but are not shown for brevity. Image forming apparatus 300, using computing platform 301, may be configured to perform various operations, such as scanning, copying, printing, receiving or sending a facsimile, or document processing. As such, image forming apparatus 300 may be a printing device or a multi-function peripheral including a scanner, and one or more functions of a copier, a facsimile device, and a printer. To provide these functions, image forming apparatus 300 includes printer components 320 to perform printing operations, copier components 322 to perform copying operations, scanner components 324 to perform scanning operations, and facsimile components to receive and send facsimile documents. CPU 302 may issue instructions to these components to perform the desired operations.

Image forming apparatus 300 also includes a finisher 311 and one or more paper cassettes 312. Finisher 311 includes rotatable downstream rollers to move papers with an image formed surface after the desired operation to a tray. Finisher 311 also may perform additional actions, such as sorting the finished papers, binding sheets of papers with staples, doubling, creasing, punching holes, folding, and the like. Paper cassettes 312 supply paper to image the various components 320, 322, 324, and 326 to create the image formed surfaces on the papers. Paper cassettes 312 may include papers having various sizes, colors, composition, and the like. Paper cassettes 312 may be removed to refill as needed.

Memory unit 306 includes memory storage locations 314 to store instructions 315. Instructions 315 are executable on CPU 202 or other processors associated with image forming apparatus 300, such as any processors within components 320, 322, 324, or 326. Memory unit 306 also may store information for various programs and applications, as well as data specific to image forming apparatus 300. For example, a storage location 314 may include data for running an operating system executed by computing platform 301 to support the components within image forming apparatus 300.

Memory unit 306 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 314 also includes any combination of readable or writable volatile memories or non-volatile memories, along with other possible memory devices.

Computing platform 301 may host one or more processors, such as CPU 302. These processors are capable of executing instructions 315. By executing these instructions, the processors cause image forming apparatus 300 to perform various operations. The processors also may incorporate processing units for specific purposes, such as application-specific integrated circuits (ASICs) and field programmable gate arrays (FPGAs). Other processors may be included for executing operations particular to components 320, 322, 324, and 326. In other words, the particular processors cause image forming apparatus 300 to act as a printer, copier, scanner, and a facsimile device.

Operation panel 308 may include a display unit 316 and an input unit 317 for facilitating interaction with a user to provide commands to image forming apparatus 300. Display unit 316 may be any electronic video display, such as a liquid crystal display (LCD). Input unit 317 may include any combination of devices that allow users to input information into operation panel 308, such as buttons, a touch screen, a keyboard or keypad, switches, dials, and the like. Preferably, input unit 317 includes a touch-screen digitizer overlaid onto display unit 316 that senses touch to receive inputs from the user. By this manner, the user interacts with display unit 316.

Image forming apparatus 300 also include network communication processing unit 318. Network communication processing unit 318 may establish a network communication, such as a wireless or wired connection with one or more other image forming apparatuses and a server in an image forming system. CPU 302 may instruct network communication processing unit 318 to transmit or retrieve information over a network using network communication interface 310. As data is received at computing platform 301 over a network, network communication processing unit 318 decodes the incoming packets and delivers them to CPU 302. CPU 302 may act accordingly by causing operations to occur on image forming apparatus 300. CPU 302 also may retrieve information stored in memory unit 306, such as settings for image forming apparatus 300.

Figure 4A:
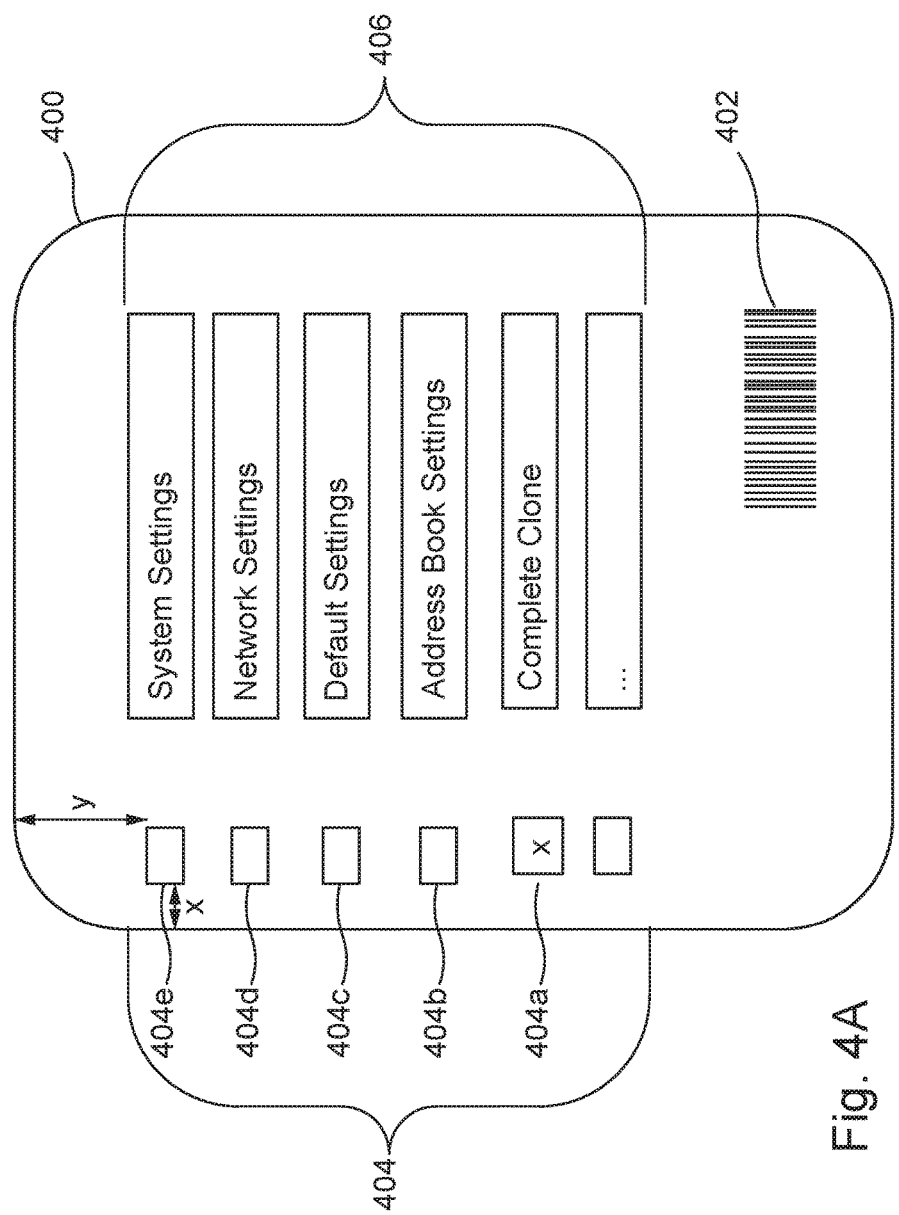
FIG. 4A illustrates a template sheet for use with an image forming apparatus according to the disclosed embodiments.

FIG. 4A depicts a template sheet 400 for use with an image forming apparatus according to the disclosed embodiments. Template sheet 400 may be printed out from source image forming apparatus 102 and used with target image forming apparatus 104. Template sheet 400 includes information that is selected to instruct target image forming apparatus 104 to retrieve and clone settings from source image forming apparatus 102.

Template sheet 400 includes a graphical code 402. In some embodiments, graphical code 402 is a barcode or a QR code. Graphical code 402 represents a unique IP address within the image forming system. An example address may be 10.10.10.121:3400. An address may be even longer so that it does not reasonably fit onto template sheet 400. Thus, a graphical code is able to embody the address in a space that fits onto a sheet. At that address, such as address 102a or storage location addresses 206, settings for source image forming apparatus 102 are stored. Other information may be stored at the indicated address. In some embodiments, graphical code 402 may represent a uniform resource locator (URL) address. Graphical code 402 allows large addresses or location information to be placed on template sheet 400 in a compact manner.

Template sheet 400 also includes operation boxes 404 that may be checked by the user to specify settings to clone to target image forming apparatus 104. The image forming apparatus that scans or reads template sheet 400 will perform operations based on the checked boxes. If no boxes are checked, then all the settings pertaining to graphical code 402 will be cloned. Operation boxes 404, however, allow the user to perform partial operations for retrieval of setting configurations.

For example, operation box 404a indicates that all settings are to be cloned from source image forming apparatus 102. All the settings are retrieved from the storage location indicated by graphical code 402. Alternatively, if subsets of the settings are desired, then other operation boxes 404 may be checked. Operation box 404b instructs target image forming apparatus 104 to retrieve address book settings, operation box 404c instructs retrieval of default settings, operation box 404d instructs retrieval of network settings, and operation box 404e instructs retrieval of system settings. Description boxes 406 provide text to indicate the settings to be retrieved. Other operation boxes 404 and description boxes 406 may be included on template sheet 400.

When scanned, the disclosed embodiments will determine whether graphics exist in these locations, such as a check mark, darkened box, and the like. Image forming apparatus 300 determines, through examination of the electronic document resulting from scanned template sheet 400, that such graphics exist in locations. Thus, if operation box 404c is marked, the disclosed embodiments identify the portions for that operation to be marked and act accordingly based on the position of the operation box on template sheet 400.

In some embodiments, operation boxes 404 are located at a specific location within template sheet 400. The location may be designated using an X, Y coordinate system. "X" may represent the distance from the left side of template sheet 400, as shown in FIG. 4A. "Y" may represent the distance from the top of template sheet 400, also shown in FIG. 4A. As shown, operation box 404e has a location indicated by X from the left side and Y from the top of template sheet 400. Operation box 404d may have the same value for X as operation box 404e, but a different value for Y. The disclosed embodiments know which operation is invoked by the X and Y coordinates and determine whether the pixels correspond to the specified X and Y coordinates are darkened. If so, then the scanning image forming apparatus determines that the operations associated with each box are to be performed. These processes are disclosed in greater detail below.

Figure 4B:
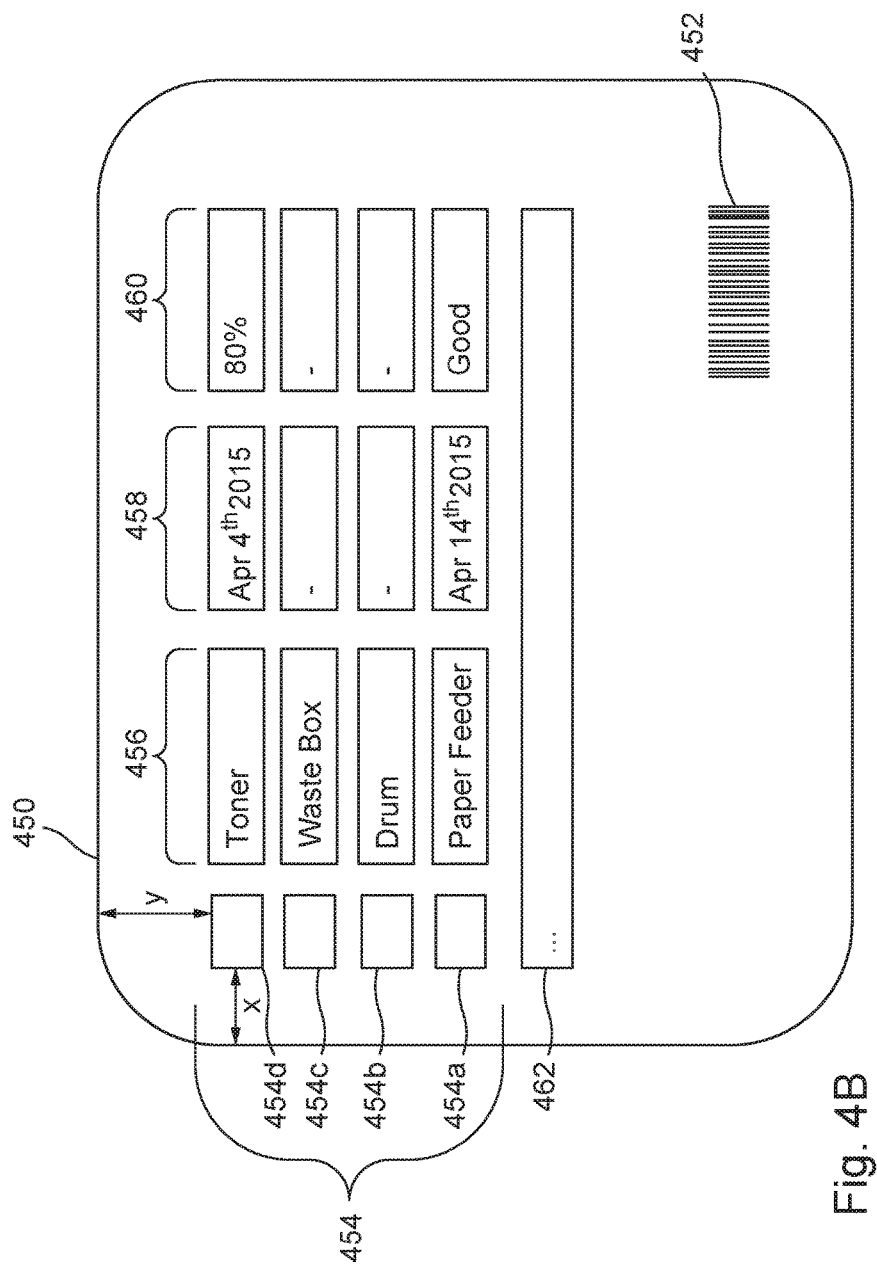
FIG. 4B illustrates another template sheet for use with an image forming apparatus according to the disclosed embodiments.

FIG. 4B depicts another template sheet 450 for use with an image forming apparatus according to the disclosed embodiments. Template sheet 450 is similar to template sheet 400 except that it may be used as a maintenance report request to obtain information about the image forming apparatus. Template sheet 450 is described in relation to image forming apparatus 300 as a network connection is not needed.

Template sheet 450 includes a graphical code 452. Graphical code 452, though not necessarily needed for a maintenance report, is provided in the event that settings need to be retrieved over a network. Template sheet 450 also includes operation boxes 454. Operation boxes 454 are marked to indicate what information to obtain from image forming apparatus 300. Other boxes are aligned with operation boxes 454, such as feature/function boxes 456, date boxes 458, and status boxes 460. The boxes provide further information about the most recent status check for the features associated with the corresponding operation box 404. Box 462 also is provided to add information to template sheet 450.

When scanned, the disclosed embodiments will determine whether graphics exist in these locations, such as a check mark, darkened box, and the like. As with template sheet 400, the disclosed embodiments determine whether the scanned pixels are darkened at specified X and Y coordinates. Image forming apparatus 300 determines, through examination of the electronic document resulting from scanned template sheet 450, that such graphics exist in these locations. Thus, if operation box 454c is marked, the disclosed embodiments identify the portions for that operation to be marked by analyzing the area matching the X and Y coordinates for this box, and act accordingly. These processes are disclosed in greater detail below.

For example, template sheet 450 indicates that the toner associated with operation box 454d and the paper feeder associated with operation box 454a was last checked on Apr. 4, 2015, and Apr. 14, 2015, respectively. The waste box associated with operation box 454c and the drum associated with operation box 454b do not have any available maintenance information. The corresponding boxes in status boxes 460 provide the result of the most recent maintenance check for reference. When the user prints out template sheet 450, he/she is provided with the status in real-time before running the next maintenance request.

Thus, a user marks which operation box 454 on template sheet 450 for a desired status. Image forming apparatus 300 scans the completed template sheet 450 at the specified X and Y coordinates and produces a maintenance report for the checked boxes. The user can use template sheet 450 at any image forming apparatus 450 without having to configure settings on the apparatus or at a computer connected to the apparatus. This feature saves time and work on behalf of checking on image forming apparatus 300. The user also may use template sheet 450 to diagnose a problem with image forming apparatus 300, such as the toner being low, any long period between replacement, and the repair of critical components.

Graphical code 452 of template sheet 450 may not be needed to retrieve settings as with graphical code 402 of template sheet 400. It may be used, however, to retrieve the most recent maintenance report information to fill boxes 456, 458, and 460. It also may be used to verify the identity of the user to perform the maintenance check. Alternatively, such information may be stored on image forming apparatus 300 within memory unit 306. Graphical code 452 directs the disclosed process to the appropriate memory storage location 314.

Graphical codes 402 and 452 both provide an added security feature when using template sheets 400 and 450. The appropriate graphical code only may be available for a set period of time in which to be scanned. If the graphical code is not scanned within that period of time, then the settings or information will not be retrieved. Another feature may be that the graphical code is useless after one use in a scanning operation. Using these processes, old template sheets may not be reused. The preferred period of time may be about 10 minutes before scanning may be prohibited.

Figure 5:
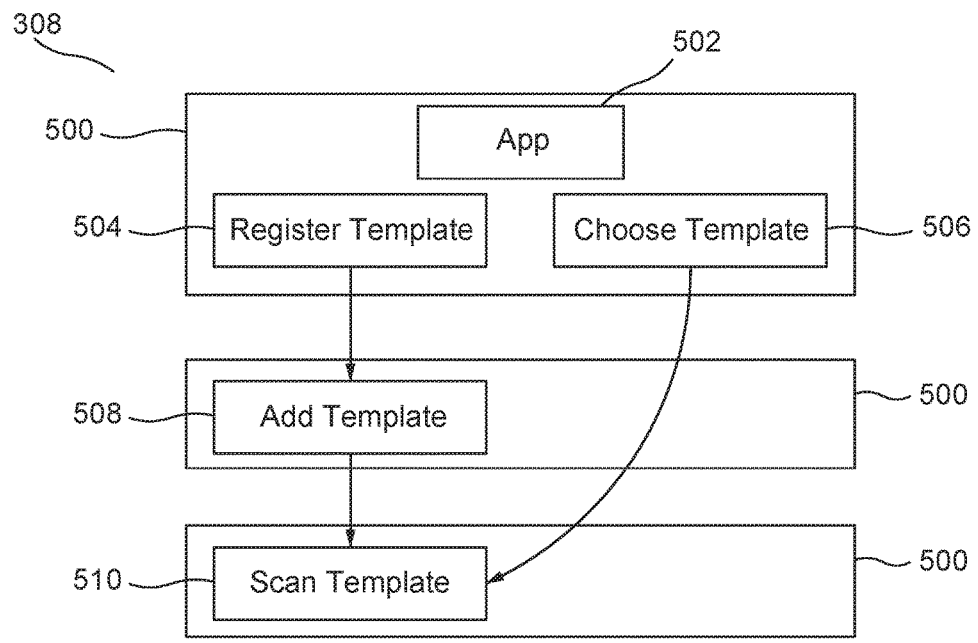
FIG. 5 illustrates a flow diagram for an operation panel having a user interface to initiate settings retrieval with a template sheet according to the disclosed embodiments.

FIG. 5 depicts screens for operation panel 308 having a user interface 500 to initiate settings retrieval with a template sheet according to the disclosed embodiments. A user interacts with operation panel 308 using user interface 500. User interface 500 is displayed using display unit 316 and communicates input to input unit 317 to perform operations on image forming apparatus 300 (as well as apparatuses 102 or 104). User interface 500 includes buttons displayed on a screen of operation panel 308.

Application button 502 is pressed to indicate that a scan operation is being initiated. The application related to application button 502 executes on CPU 302 to indicate to the rest of image forming apparatus 300 that a scan is to be received, and, if appropriate, a print operation to be performed. The application will release image forming apparatus 300 from the requested operations once the scan or print job is complete.

Below application button 502 are register template buttons 504 and choose template buttons 506. The user may select to add a template to the library of templates already available using register template button 504. User interface 500 then presents add template button 508 for the user to input this command. If the template is already available, then the user selects choose template button 506. The user may choose available template options presented using user interface 500. After a template is added or chosen, user interface 500 presents scan template button 510 to press to scan the template.

FIGS. 6-16 include flowcharts and flow diagrams to illustrate the functions for configuring settings or initiating operations on an image forming apparatus. FIGS. 6-16 will be disclosed using elements from FIGS. 1-5, where appropriate. Where operations occur between two image forming apparatuses, source image forming apparatus 102 and target image forming apparatus 104 will be described. If only a single image forming apparatus is described, then image forming apparatus 300 will be used. It should be noted that the features shown in FIG. 3 are applicable to source image forming apparatus 102 and target image forming apparatus 104.

Figure 6:
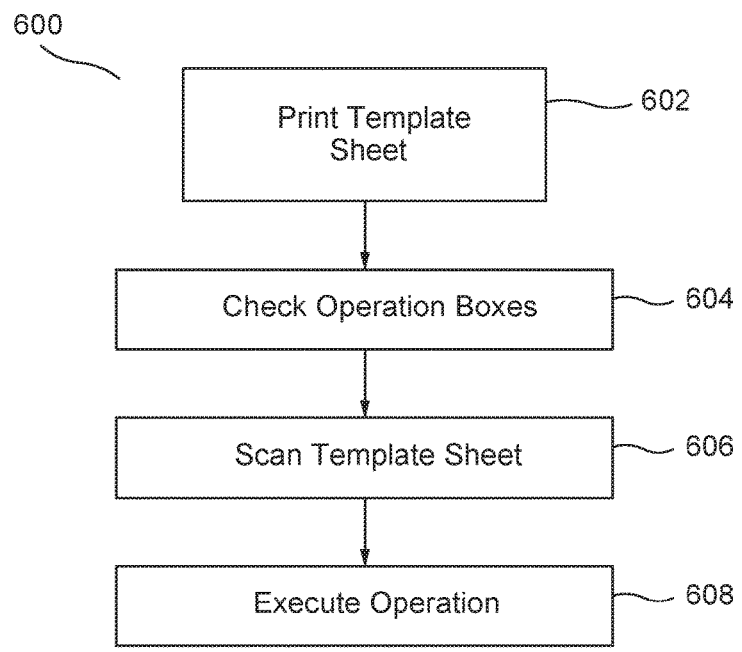
FIG. 6 illustrates a flowchart for initiating operations on an image forming apparatus with a template sheet according to the disclosed embodiments.

FIG. 6 depicts a flowchart 600 for initiating operations on an image forming apparatus with a template sheet according to the disclosed embodiments. The operations shown by flowchart 600 may be commenced by computing platform 301 within an image forming apparatus. The steps are executed by CPU 302 and other associated processors within the image forming apparatus.

Step 602 executes by printing a template sheet. Template sheet 400 or 450 may be used. Preferably, the template sheet includes a graphical code 402 or 452 and operation boxes, as shown above. The template sheet may be selected or added using the user interface disclosed in FIG. 5. Step 604 executes by checking the appropriate operation boxes by the user. Referring to template sheet 400, one or more operation boxes 404 may be checked to perform the desired operation.

Step 606 executes by scanning the template sheet by the image forming apparatus. In a network having more than one apparatus, a target image forming apparatus 104 scans the template sheet. The disclosed embodiments review the scanned template sheet to determine which operations were selected. The location of graphics on the template sheet matching specified X and Y coordinates instructs the disclosed embodiments what operations are to be performed. Step 608 executes by executing the checked operation(s) on the image forming apparatus. Operations may include retrieving settings information from another apparatus or server, or performing maintenance status checks. An operation also may be to print out any results.

Figure 7:
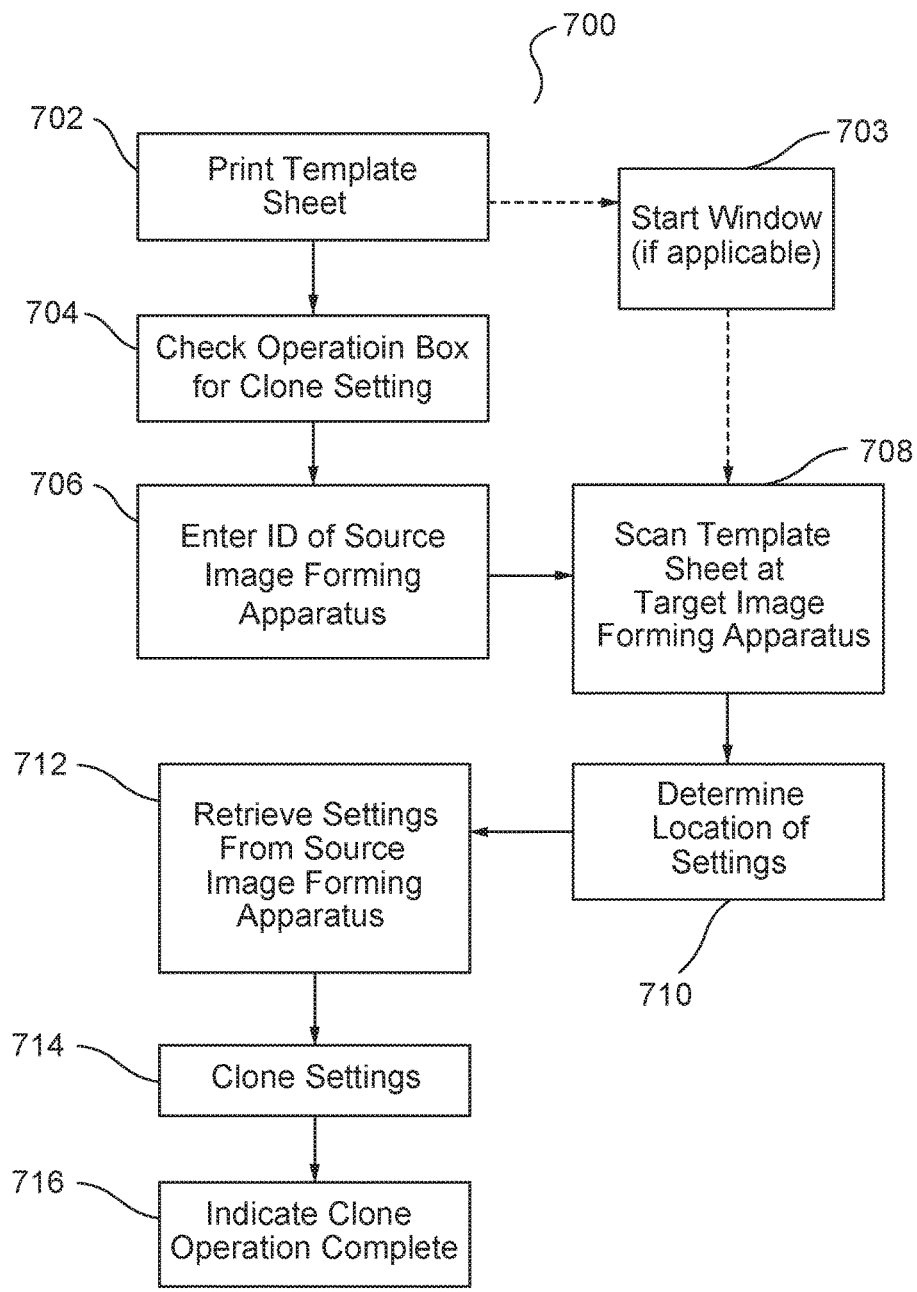
FIG. 7 illustrates a flowchart for cloning settings from a source image forming apparatus according to the disclosed embodiments.

FIG. 7 depicts a flowchart 700 for cloning settings from a source image forming apparatus 102 according to the disclosed embodiments. Step 702 executes by printing template sheet 400 for cloning settings from another image forming apparatus. Step 703 may be an optional step that executes by starting a "window" to allow all target image forming apparatuses to access the source image forming apparatus identified by template sheet 400. In some embodiments, this window of time may be about 10 minutes. Thus, when a user prints out template sheet 400 at source image forming apparatus 102, he/she has a 10 minute window to scan the completed template sheet or the code becomes invalid. For example, graphical code 402 may include an access code having the IP address of source image forming apparatus 102 plus a temporary port. After the window is finished, the temporary port will close.

Step 704 executes by checking operation box 404a to clone settings from source image forming apparatus 102 designated by graphical code 402. In some embodiments, template sheet 400 is scanned at the X and Y coordinates associated with the operation boxes to determine which operation to execute. If darkened pixels are determined to be in the area of these coordinates, then the operations are to be performed.

Step 706 executes by entering the identification number or code for source image forming apparatus 102. This step may prevent unauthorized access from a user or target image forming apparatus 104. Further, the disclosed embodiments may use the entered identification to cross check against information embedded in graphical code 402. If the window option is selected in step 703, then this step may not have to be executed as access is provided by the temporary window.

Step 708 executes by scanning template sheet 400 at target image forming apparatus 104. Using operation panel 308, the sheet is scanned in response to prompts by the executed application. If the scan does not occur within the window specified by step 703, then an error message may be displayed. Step 710 executes by determining a location for the settings. Graphical code 402 may include an address where the information for the settings is stored. Using the identification entered in step 706, the address is used to determine storage location 314 where to obtain the settings in memory unit 306. Alternatively, as disclosed below, the information for the settings may be located on a server 202 or other location within the network connecting the image forming apparatuses.

Step 712 executes by retrieving the setting information from storage location address 314. The information may be sent as a data file 105 through the network to target image forming apparatus 104. Step 714 executes by cloning the settings from the setting information to target image forming apparatus 104. Thus, the target apparatus will operate according to the retrieved settings. The retrieved settings may be stored in memory unit 306 of the target apparatus. Step 716 executes by indicating completion of the cloning operations. Step 716 may print a confirmation sheet for the user to review. Further, a prompt may be displayed on display unit 316 that the cloning operation was successful and the settings are ready to be used.

Figure 8:
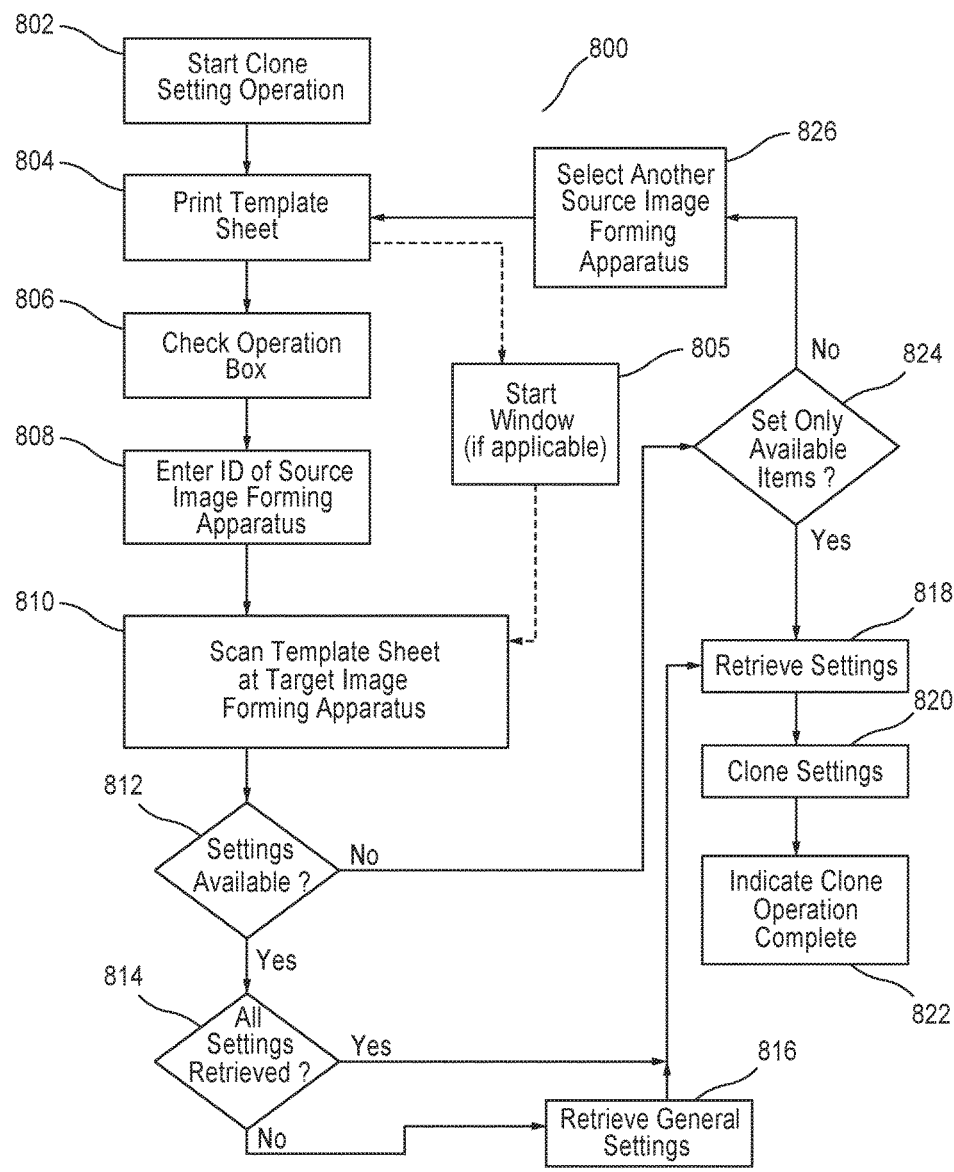
FIG. 8 illustrates a flowchart for cloning settings between image forming apparatuses in the same local network according to the disclosed embodiments.

FIG. 8 depicts a flowchart 800 for cloning settings between image forming apparatuses in the same local network according to the disclosed embodiments. For flowchart 800, reference will be made to source image forming apparatus 102 and target image forming apparatus 104 as shown in FIG. 1.

Step 802 executes by starting the clone setting operation. The operation may be started by pressing the appropriate button within user interface 500. Step 804 executes by printing a template sheet 400 at source image forming apparatus 102 or target image forming apparatus 104. Thus, the user may print template sheet 400 and carry it to target image forming apparatus 104 or just print it directly to have the sheet available at the target apparatus.

Step 805 may be an optional step that executes by starting a "window" to allow all target image forming apparatuses to access the source image forming apparatus identified by template sheet 400, similar to step 703 disclosed above. In some embodiments, this window of time may be about 10 minutes. Thus, when a user prints out template sheet 400 at source image forming apparatus 102, he/she has a 10 minute window to scan the completed template sheet or the code becomes invalid. For example, graphical code 402 may include an access code having the IP address of source image forming apparatus 102 plus a temporary port. After the window is finished, the temporary port will close.

Step 806 executes by checking the appropriate operation box on template sheet 400. To clone all settings, operation box 404a is checked. To clone only specific settings, the corresponding operation box 404 is checked. It should be noted that "checking" also may occur using template sheet 400 in an electronic form prior to step 804 so that the sheet prints out with the appropriate operation box already checked. Alternatively, the checked boxed may be done manually.

Step 808 executes by entering the identification number or code for source image forming apparatus 102 for which to clone settings. Preferably, the identification is entered at target image forming apparatus 104. If the window option is selected in step 805, then this step may not need to be executed as the access code for source image forming apparatus 102 plus a temporary port are included in graphical code 402. If template sheet 400 is not scanned at a target image forming apparatus, then the port will close. An error message may be displayed.

Step 810 executes by scanning completed template sheet 400 at target image forming apparatus 104. Referring to FIG. 3, computing platform 301 may instruct scanning components 324 to scan the document. After completion of the scanning operation, graphical code 402 indicates the address to retrieve the settings from source image forming apparatus 102, as disclosed above. Step 810 also may determine whether one or more operation boxes have been checked by analyzing the specific X and Y coordinates within template sheet 400 for darkened boxes.

Step 812 executes by determining whether all the information for the settings of source image forming apparatus are available. A list of settings for target image forming apparatus 104 may exist, such as printer settings, scanner settings, and the like. Source image forming apparatus 102 may not include all these settings. For example, source image forming apparatus 102 may not include a facsimile function and, therefore, does not include settings for facsimile components 326. Target image forming apparatus 104 may include facsimile components 326. Thus, no settings information for source image forming apparatus 102 is available to clone for facsimile components 326.

If step 812 is yes, then all the settings are available to be cloned to target image forming apparatus 104. Step 814 executes by determining whether all settings have been retrieved over network 106 from source image forming apparatus 102. A determination may be made after a download of data file 105 is complete. The disclosed process checks to see that all information was received. If no, then step 816 executes by retrieving general settings information. This information may be available at either image forming apparatus. The functions of target image forming apparatus 104 should not be unavailable to the user just because all settings were not received. Step 816 allows the user to proceed without delay using the general settings. Those settings retrieved from source image forming apparatus 102, however, may be cloned.

If step 814 is yes, then flowchart 800 proceeds to step 818. Step 818 executes by retrieving the received settings from source image forming apparatus 102. This step may execute by opening data file 105 at target image forming apparatus 104. Step 820 executes by cloning the information for the settings onto target image forming apparatus 104. Step 822 executes by indicating the clone operation is complete by printing an acknowledgement or displaying a prompt on display unit 316. Further, an audible confirmation may be provided to the user.

If step 812 is no, then all the desired settings for target image forming apparatus are not available. Flowchart 800 proceeds to step 824 to determine whether target image forming apparatus 104 should set or clone only those settings available from source image forming apparatus 102. In other words, should the disclosed process proceed despite the lack of information for all the settings. If step 824 is no, then flowchart 800 proceeds to step 826 to select another source image forming apparatus 102 within network 106. Flowchart 800 then returns to step 804. If step 824 is yes, then flowchart 800 proceeds to step 818 to retrieve the information for the settings.

Figure 9:
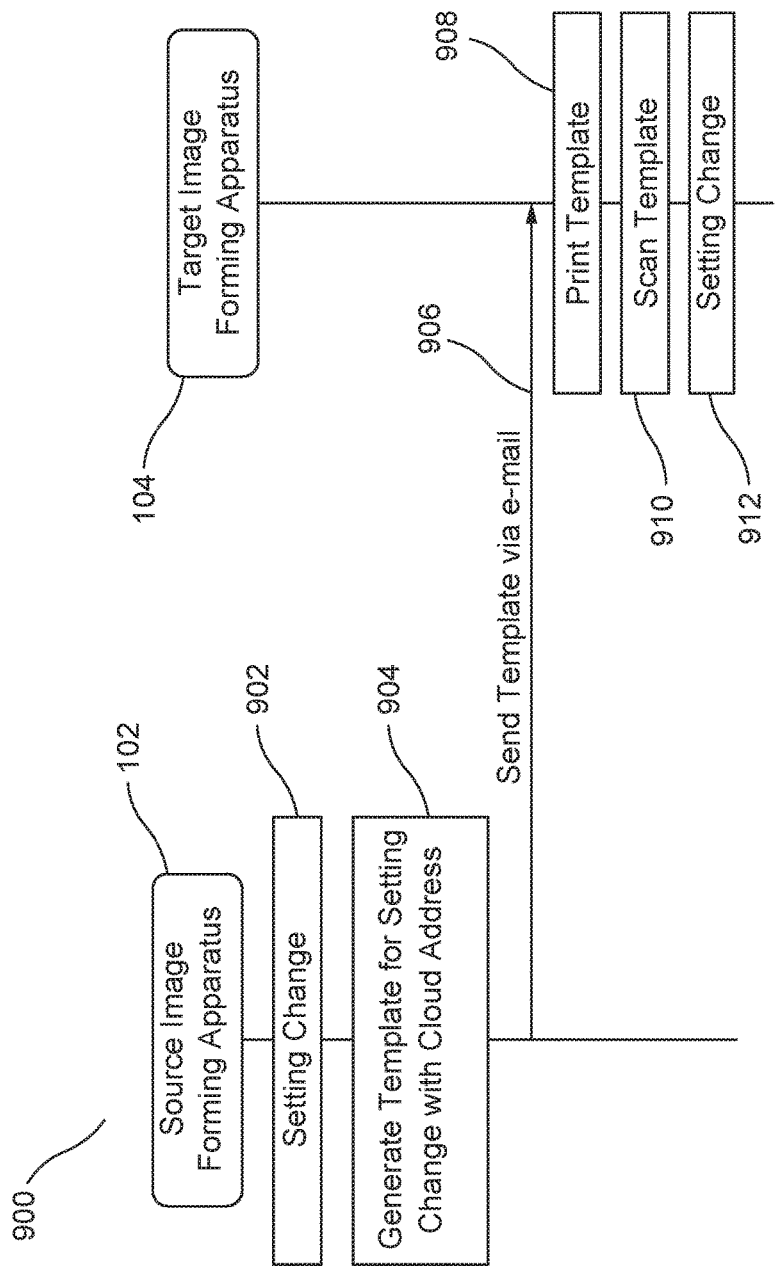
FIG. 9 illustrates a flow diagram for cloning settings between image forming apparatuses in different local networks according to the disclosed embodiments.

FIG. 9 illustrates a flow diagram 900 for cloning settings between image forming apparatuses in different local networks according to the disclosed embodiments. Flow diagram 900 may apply to system 200 shown in FIG. 2. Source image forming apparatus 102 and target image forming apparatus 104 may use network 207 to exchange information between their respective LANs using template sheet 400.

Flow diagram 900 shows the operations performed by source image forming apparatus 102 and target image forming apparatus 104. Thus, operation 902 receives input that the settings are to be changed or cloned from source image forming apparatus 102. Operation 904 generates a template sheet 400 for cloning the setting information with a cloud address, as shown by graphical code 402. The cloud address of source image forming apparatus 102, or address 102a, is placed on template sheet 400 in the form of graphical code 402.

Operation 906 sends template sheet 400 in electronic form via email over network 207 to target image forming apparatus 104. Template sheet 400 may be a document attached to the email or may be included in the body of the email. Data file 105 may represent the email. Target image forming apparatus 104 may receive the email. Alternatively, the user may receive the email at another computing device. Operation 908 prints template sheet 400. If the email is received at another computing device, then template sheet 400 is sent to target image forming apparatus 104 for printing. Step 910 executes by scanning a completed template sheet 400 with one or more operation boxes 404 checked, as disclosed above. If the window option is in effect, then the user must scan template sheet 400 before the window closes, such as within 10 minutes after operation 908.

Target image forming apparatus 104 may retrieve the information for the settings as disclosed above using the address corresponding to scanned graphical code 402. Data file 105 is sent from source image forming apparatus 102. Once received, operation 912 executes by changing or cloning the settings to target image forming apparatus 104.

Figure 10:
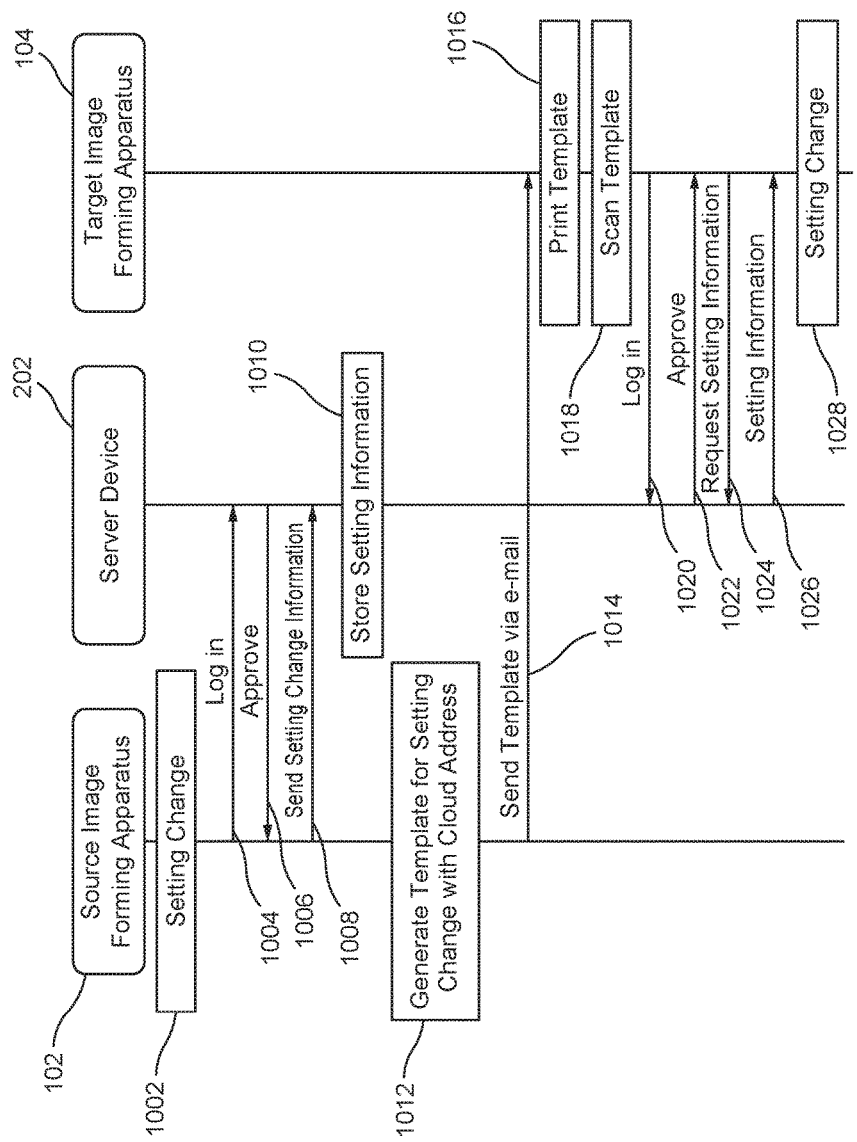
FIG. 10 illustrates a flow diagram for cloning settings between image forming apparatuses in different local networks using a server according to the disclosed embodiments.

FIG. 10 illustrates a flow diagram 1000 for cloning settings between image forming apparatuses in different local networks using a server 202 according to the disclosed embodiments. Flow diagram 1000 differs from flow diagram 900 in that operations also are performed using a server 202, as shown in system 200. Server 202 may be appropriate where storage capacity is limited on the image forming apparatuses or there is no direct connection between local area networks. Further, server 202 may provide an added layer of security to prevent unauthorized access to an image forming apparatus. The devices disclosed herein may be connected by a wide area network 207.

Operation 1002 receives input that the settings are to be changed or cloned from source image forming apparatus 102. Operation 1004 logs source image forming apparatus 102 into server 202. The user may input, using operation panel 308, information to access server 202. Server 202 and source image forming apparatus 102 may not be in the same location or even connected to the same local area network. Operation 1006 sends back an approval from server 202 that a link is established.

Operation 1008 sends information for the settings of source image forming apparatus 102 to server 202. These settings may relate to all settings saved at the source apparatus. Alternatively, the settings may be for the user initiating the process. Operation 1010 stores the information for the settings in a memory storage location indicated by a cloud address, such as a storage location address 206. Preferably, this address is an IP address that is available throughout the network. Server 202 may include database 204 to store the data.

Operation 1012 generates a template sheet 400 for cloning the settings from source image forming apparatus 102. Template sheet 400 includes graphical code 402 having the cloud address for the settings at server 202. The template sheet may be stored at source image forming apparatus 102. Operation 1014 sends saved template sheet 400 to target image forming apparatus 104 from source image forming apparatus 102 over network 207. The applicable source image forming apparatus is the one for which the user desires to clone the settings.

Operation 1016 prints template sheet 400. The user then checks the operations to be performed, or the settings to retrieve. Operations 1018 scans completed template sheet 400. Operation 1018 detects graphical code 402 and any checked operation boxes 404. The disclosed process determines which server 202 to access for the information for the settings using graphical code 402. If the window option is in effect, then the user must scan template sheet 400 before the window closes, such as within 10 minutes after operation 1016.

Operation 1020 logs target image forming apparatus 104 onto server 202, much like operation 1004 disclosed above. Server 202 reviews the credentials or log in information to approve access. Operation 1022 sends this approval to target image forming apparatus 104 and establishes a link with server 202.

Operation 1024 requests the information for the settings from source image forming apparatus 102. Target image forming apparatus 104 accesses the memory storage location using the address in server 202 indicated by graphical code 402. The address preferably is unique within the network. Operation 1026 sends the requested information for the settings to target image forming apparatus 104. Operation 1028 executes by changing or cloning the settings to target image forming apparatus 104. In some embodiments, data file 105 is not sent directly from source image forming apparatus 102 to target image forming apparatus 104, but is sent, instead, to server 202. Server 202 then sends data file 105 enclosing the information for the settings.

In some embodiments, a template sheet may be used at a single image forming apparatus to perform operations. These operations may be used to back up the settings for an apparatus over a network and to change settings or perform maintenance checks on the apparatus without connecting to the network. These embodiments are disclosed in greater detail below. As the processes typically involved a single apparatus, the disclosure will refer to image forming apparatus 300.

Figure 11:
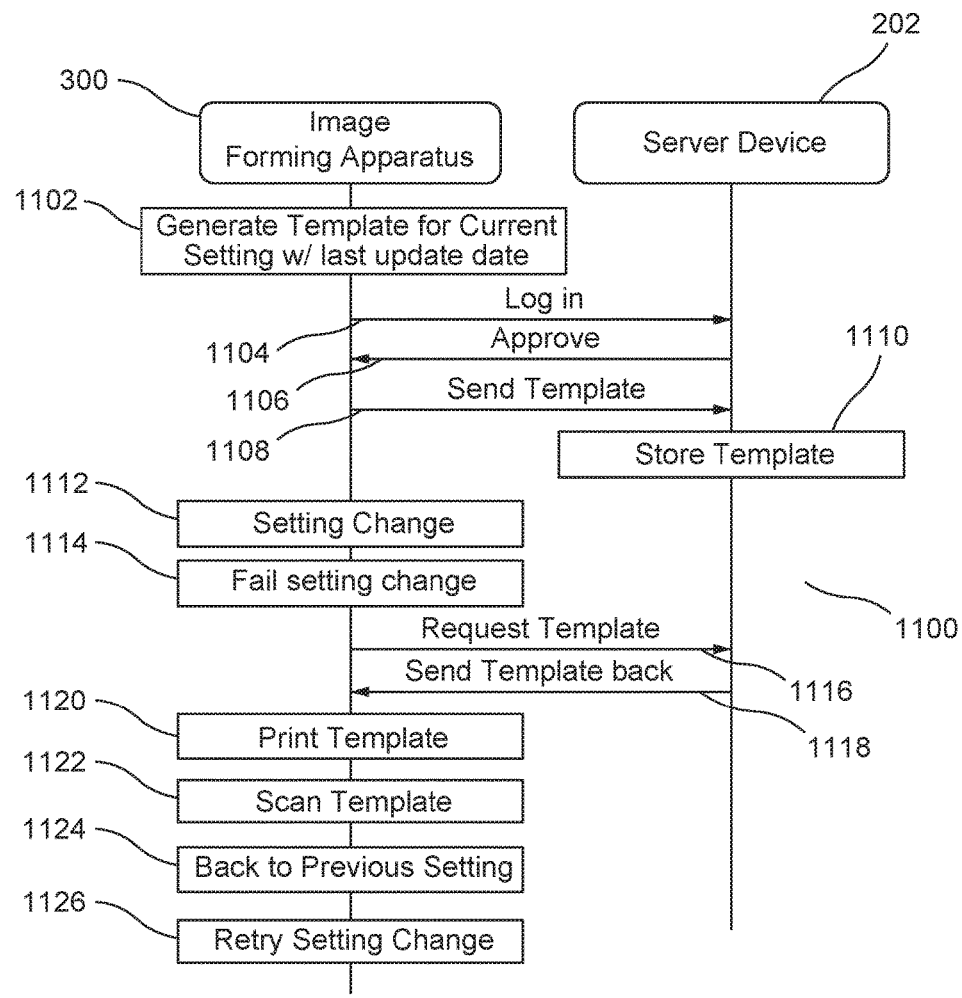
FIG. 11 illustrates a flow diagram for a reset of settings for an image forming apparatus with a cloud server according to the disclosed embodiments.

FIG. 11 illustrates a flow diagram 1100 for a reset of settings for an image forming apparatus 300 with a cloud server 202 according to the disclosed embodiments. The process disclosed by flow diagram 1100 may be used when settings are changed on image forming apparatus 300 and need to be restored or changed. Instead of manually changing settings or having to use a computer, the disclosed process allows the settings to be restored at the apparatus using template sheet 400.

Operation 1102 generates template sheet 400 for the current settings with a last update date. Template sheet 400 includes graphical code 402 for a storage location address within image forming apparatus 300 to retrieve the information. Operation 1104 logs image forming apparatus 300 into server 202. The user may input, using operation panel 308, information to access server 202. Server 202 and image forming apparatus 300 may not be in the same location or even connected to the same local area network. Operation 1106 send back an approval from server 202 that a link is established.

Operation 1108 sends generated template sheet 400 to server 202. It may be sent as a data file 105 from image forming apparatus 300. Operation 1110 stores the template sheet at a storage location address 206 within database 204 or server 202. Preferably, this address may be a cloud address. Image forming device 300 can access the stored information at this address.

Operation 1112 performs changes to the settings for image forming apparatus 300. For example, a user may desire to change a setting for scanning documents on apparatus 300. The user inputs the changes or uses the processes disclosed above to change the settings. Operation 1114 fails the setting changes. Using the example above, scanner components 324 may not be able to implement the change. Perhaps the size of the pages of the document cannot be scanned.

In this instance, the user may be notified that the changes to the settings failed. The user, however, may not remember the original settings for image forming apparatus 300 or is not near a computer to reset the settings. Flow diagram 1100 performs operation 1116 to request template sheet 400 from server 202. Instead of prompting the user to reenter the settings, image forming apparatus 300 sends a request over the network. Operation 1118 sends the stored template sheet 400 to image forming apparatus 300.

Operation 1120 prints template sheet 400 on image forming apparatus 300, or any other device. As shown above, template sheet 400 includes graphical code 402 to retrieve the information for the settings along with operation boxes 404. The user marks any applicable boxes. Operation 1122 scans completed template sheet 400 and retrieves the settings as disclosed above. In some embodiments, the settings are stored on image forming apparatus 300 so that it may not have to retrieve information from server 202 (or another image forming apparatus). Operation 1124 resets the settings back to the previous settings in place prior to operation 1112. Operation 1126 retries the change in the settings. This operation retries to determine if the failure may not be with image forming apparatus 300, but a minor error that has been resolved.

Figure 12:
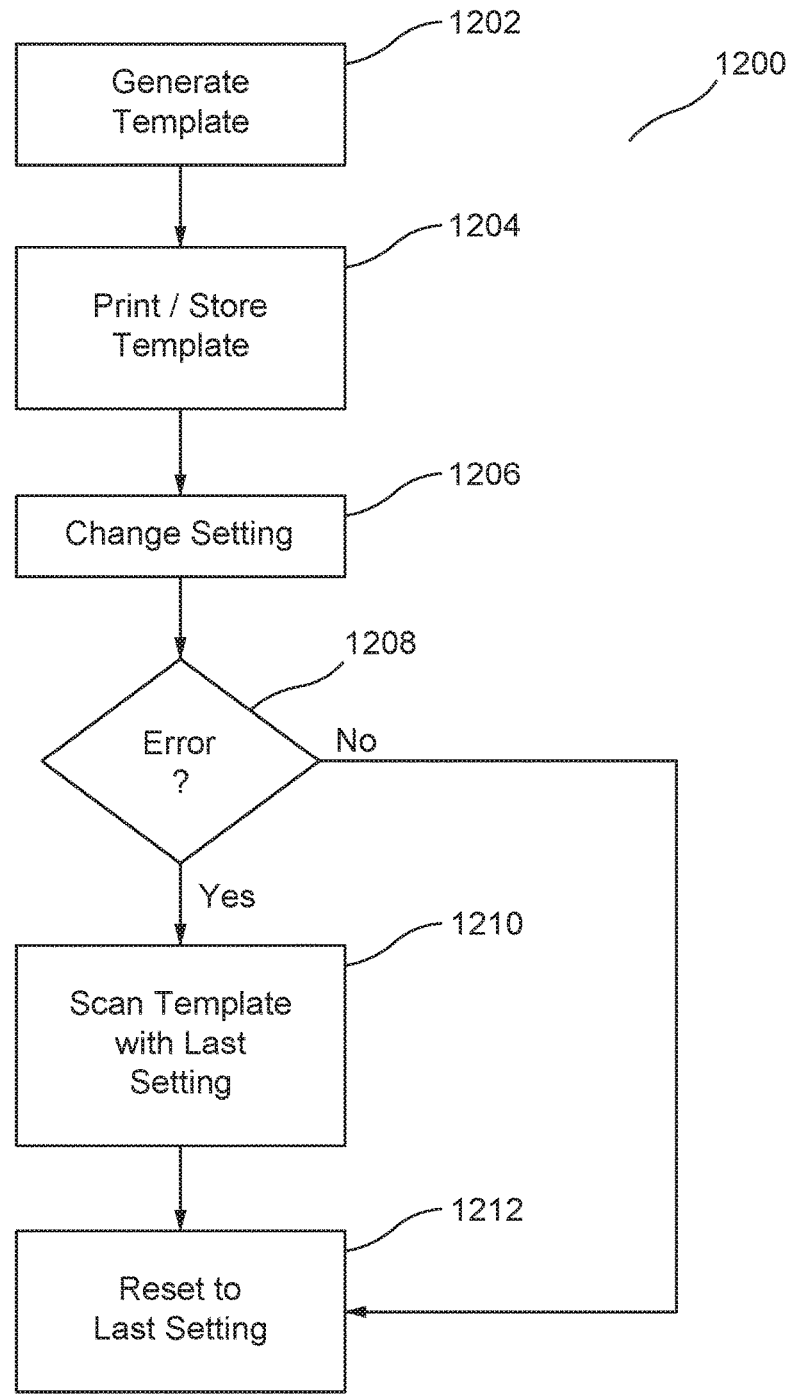
FIG. 12 illustrates a flowchart for resetting an image forming apparatus with a template sheet according to the disclosed embodiments.

FIG. 12 depicts a flowchart 1200 for resetting an image forming apparatus 300 with a template sheet 400 according to the disclosed embodiments. Flowchart 1200 physically resets image forming apparatus 300 with a printed template sheet 400. Step 1202 executes by generating template sheet 400, as disclosed above. Step 1204 executes by printing or storing template sheet 400 at a storage location address, such as memory unit 306 in image forming apparatus 300 or a storage location address 206 within database 204 or server 202. Any graphical code 402 on template sheet 400 should indicate this address. The printed template sheet may be available for use at any time.

Step 1206 executes by changing one or more settings on image forming apparatus 300. As disclosed in flow diagram 1100, the user may want to change settings for an operation on the apparatus, possibly for only a specific job. The user enters the changes. Step 1208 executes by determining whether an error occurred during the change. Image forming apparatus 300 may not accept the change to the settings or is unable to comply with the request.

If step 1208 is yes, then step 1210 executes by scanning the completed template sheet at image forming apparatus 300. Graphical code 402 refers to the storage address location with the last settings saved prior to the change being made in step 1206. Using the disclosed process, image forming apparatus 300 retrieves the "stored information" for the last settings. Step 1212 executes by resetting image forming apparatus 300 to the last settings stored.

If step 1208 is no, then flowcharts 1200 proceeds to step 1212 to reset the last settings after the operation on image forming apparatus 300 is completed. Alternatively, the step may be skipped or not used until an error has been detected. Thus, if settings are changed on image forming apparatus, then the user may immediately change the settings back to their original configuration. This operation saves time and effort for resetting the settings. Image forming apparatus 300 retrieves the settings and applies them to image forming apparatus 300.

Figure 13:
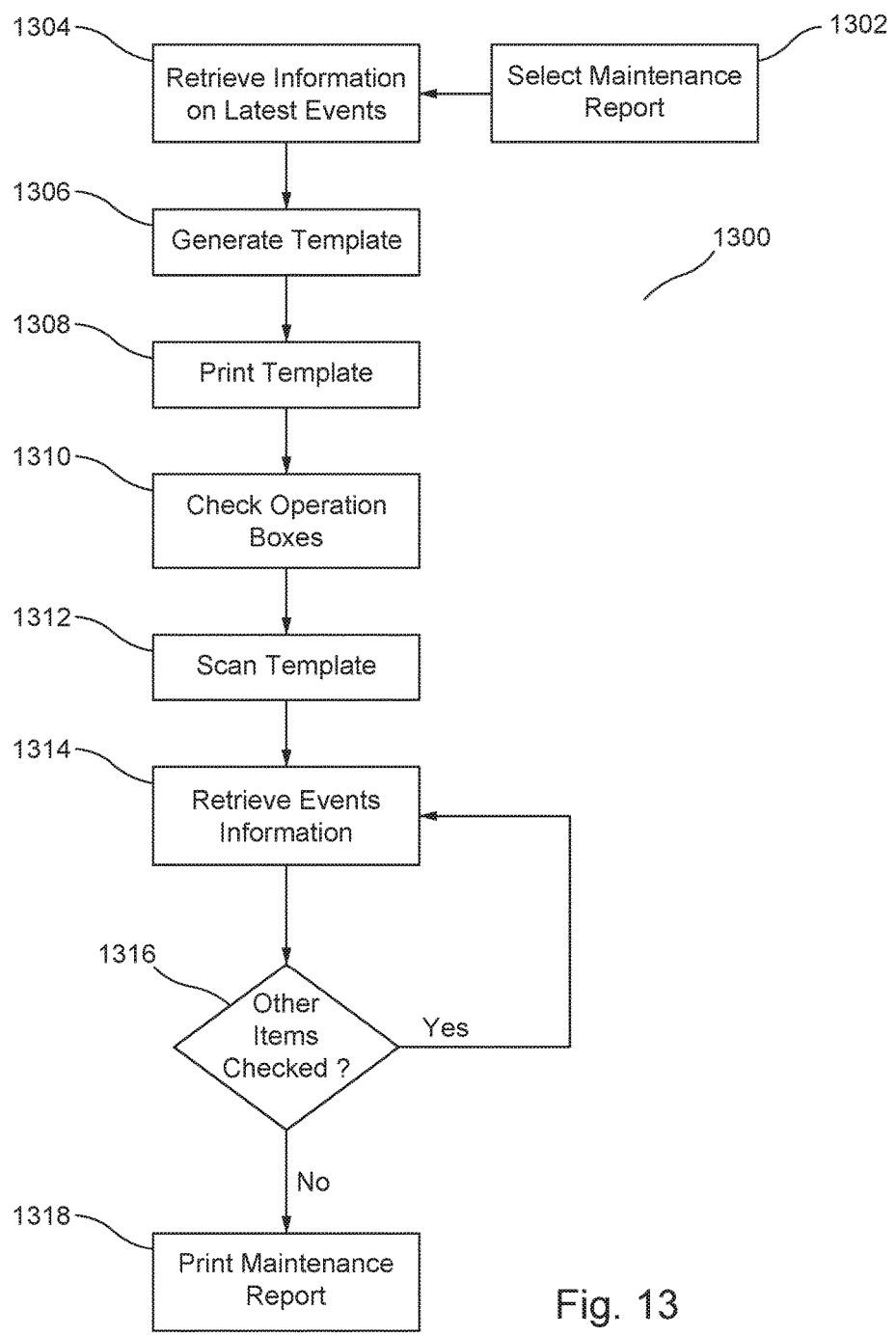
FIG. 13 illustrates a flowchart for generating a maintenance report for an image forming apparatus using a template sheet according to the disclosed embodiments.

FIG. 13 illustrates a flowchart 1300 for generating a maintenance report for image forming apparatus 300 using a template sheet 450 according to the disclosed embodiments. The disclosed embodiments may use template sheet 450 to retrieve information about image forming apparatus 300. Preferably, this information is maintenance information about different components within the image forming apparatus. Thus, the process disclosed in flowchart 1300 is not necessarily retrieving settings, but a different type of information indicated on template sheet 450.

Step 1302 executes by selecting a maintenance report operation to be performed on image forming apparatus 300. Preferably, the image forming apparatus is one physically located near the user such that the user can scan documents on the apparatus. For example, the network of image forming apparatuses may include a large number of devices to check for maintenance issues. Instead of inputting requests at each machine or using a computer, the user may perform the maintenance checks at the computer without need specific information. The user merely selects the operation to be performed at the apparatus and flowchart 1300 executes the operation. In these embodiments, the user completes template sheet 450 shown in FIG. 4B.

Step 1304 executes by retrieving information on the latest events for items/operations listed on template sheet 450. This information may be stored at server 202. In other words, the last maintenance update is stored someplace on the network, or may be stored at image forming apparatus 300. Referring back to FIG. 4B, operation boxes 454 align with feature/function boxes 456, date boxes 458, and status boxes 460. The retrieved information is used to fill these boxes, if available. For example, if no information is available for the last event, then it is not listed. Step 1306 executes by generating template sheet 450 with the latest events and dates of service. Step 1308 executes by printing template sheet 450 at image forming apparatus 300.

The printed template sheet provides the user with up-to-date information on image forming apparatus 300. The user determines what items, described by feature/function boxes 456, that he/she wants to check. The user can see how long it has been since the last check and proceed accordingly. Step 1310 executes by checking applicable operation boxes 454 for the items listed. For example, referring to template sheet 450, no maintenance information is shown for operation box 454c, or the waste box, and operation box 454b, or the drum. The user checks these boxes to retrieve maintenance report information for these components.

Step 1312 executes by scanning template sheet 450. Graphical code 452 may be used to provide the security window to scan the template sheet. It also may be used to verify that the user is allowed to request such information from this specific image forming apparatus. Graphical code 452 also may indicate the memory locations within memory unit 306 that such information is stored. In other words, as maintenance actions occur, the date and time may be stored at a storage location address 314. Step 1312 executes by retrieving the events information stored in the memory since the last report.

Step 1316 executes by determining whether other items are checked on template sheet 450. As disclosed above, the disclosed embodiments may determine if the area around specified locations identified by X and Y coordinates are darkened. Each operation box may have its own X and Y coordinate value within template sheet 450. If yes, then flowchart 1300 returns to step 1314 to retrieve that information. Using this process, image forming apparatus 300 looks to whether an operation box 454 has been checked to see what information to update. It may do so sequentially. If an operation box 454 is not checked, then the information may not be retrieved. Alternatively, if no box is checked, then all information is retrieved for all items from the storage location indicated by graphical code 452.

If step 1316 is no, then step 1318 executes by printing the maintenance report at image forming apparatus 300. The maintenance report may resemble template sheet 450 with the information updated in the appropriate boxes 458 and 460. The retrieved information also may be provided or stored in the associated memory storage location for retrieval in step 1304 during the next maintenance check. Items printed on the maintenance report may include events, for example, when to exchange the toner cartridge for printer components 320, paper jams or other performance problems in apparatus 300, any software or firmware updates, and the like.

Figure 14:
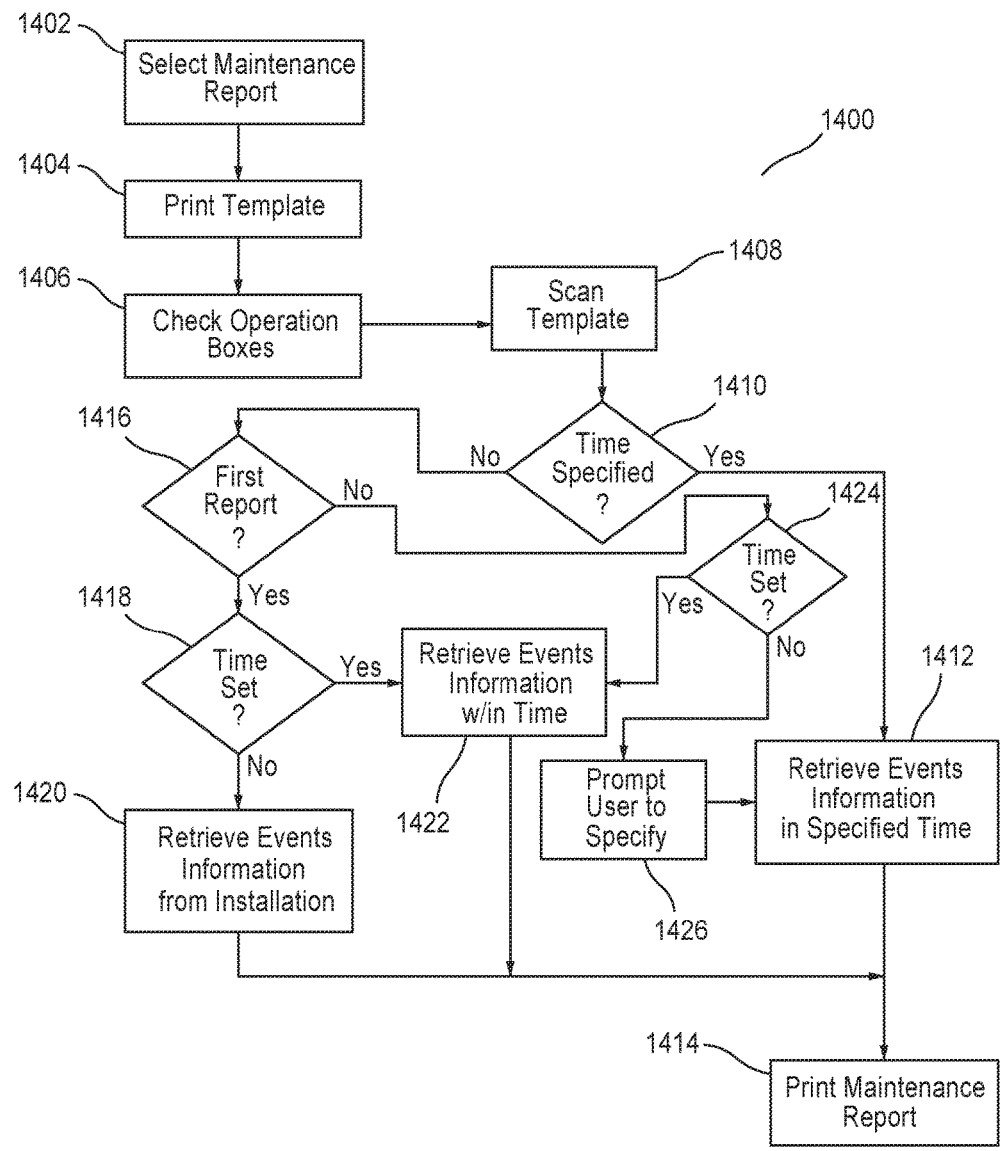
FIG. 14 illustrates a flowchart for generating a maintenance report for an image forming apparatus using a template sheet according to the disclosed embodiments.

FIG. 14 depicts another flowchart 1400 for generating a maintenance report for an image forming apparatus 300 using a template sheet 450 according to the disclosed embodiments. Flowchart 1400 may differ from flowchart 1300 in that the user may specify times from which to retrieve information.

Step 1402 executes by selecting a maintenance report operation to be performed on image forming apparatus 300. Step 1404 executes by printing template sheet 450 having operation boxes 454, as disclosed above. Step 1406 executes by checking operation boxes 454 for the items, or components, to be reported in the maintenance report. Step 1408 executes by scanning template sheet 450 at image forming apparatus 300. In this step, the locations for specific operation boxes may be analyzed to see if these locations have been darkened. Each location may have its own X and Y coordinate for the corresponding operation box.

Step 1410 determines whether a time is specified on template sheet 450. The time may refer to a specific date or date range from which to retrieve maintenance information. For example, the user may only be interested in information on maintenance performed in the last six months. The time may be inputted into image forming apparatus using operation panel 308. A prompt may be displayed to input the date or dates to run the report. The prompt also may be ignored. Alternatively, image forming apparatus 300 may recognize date information provided on template sheet 450. The date may be placed in box 462.

If step 1410 is yes, then step 1412 executes by retrieving events information for the selected items in the specified time. Using the above example, if the time specified is six months ago, then the disclosed embodiments retrieves that information generated and stored within the last six months. Step 1414 executes by printing the maintenance report showing the selected information.

If step 1410 is no, then step 1416 executes by determining whether the submitted template sheet is the first time that a maintenance report has been requested. If yes, then step 1418 executes by determining whether a predetermined time has been set for the maintenance report operations on image forming apparatus 300. The disclosed process may specify the dates used to retrieve information, much like the specified time, but a predetermined one. Image forming apparatus 300 may have a default predetermined time for use in all maintenance report operations.

If step 1418 is no, then step 1420 executes by retrieving events information for image forming apparatus 300 from installation. Thus, some information will be provided in the maintenance report. Flowchart 1400 then proceeds to step 1414. If step 1418 is yes, then step 1422 executes by retrieving events information within the predetermined time. For example, if the predetermined time is three months, then events information generated and stored within the last three months is retrieved. Flowchart 1400 then proceeds to step 1414.

If step 1416 is no, then this is not the first maintenance report requested at image forming apparatus 300. Step 1424 executes by determining whether a predetermined time is set for performing maintenance report operations. If yes, then flowchart 1400 proceeds to step 1422. If step 1416 is no, then step 1426 executes by prompting the user to specify a time to run the maintenance report. The user inputs the date or time. Other options may available in this step, such as last time maintenance information was generated. Flowchart 1400 proceeds to step 1412.

Figure 15:
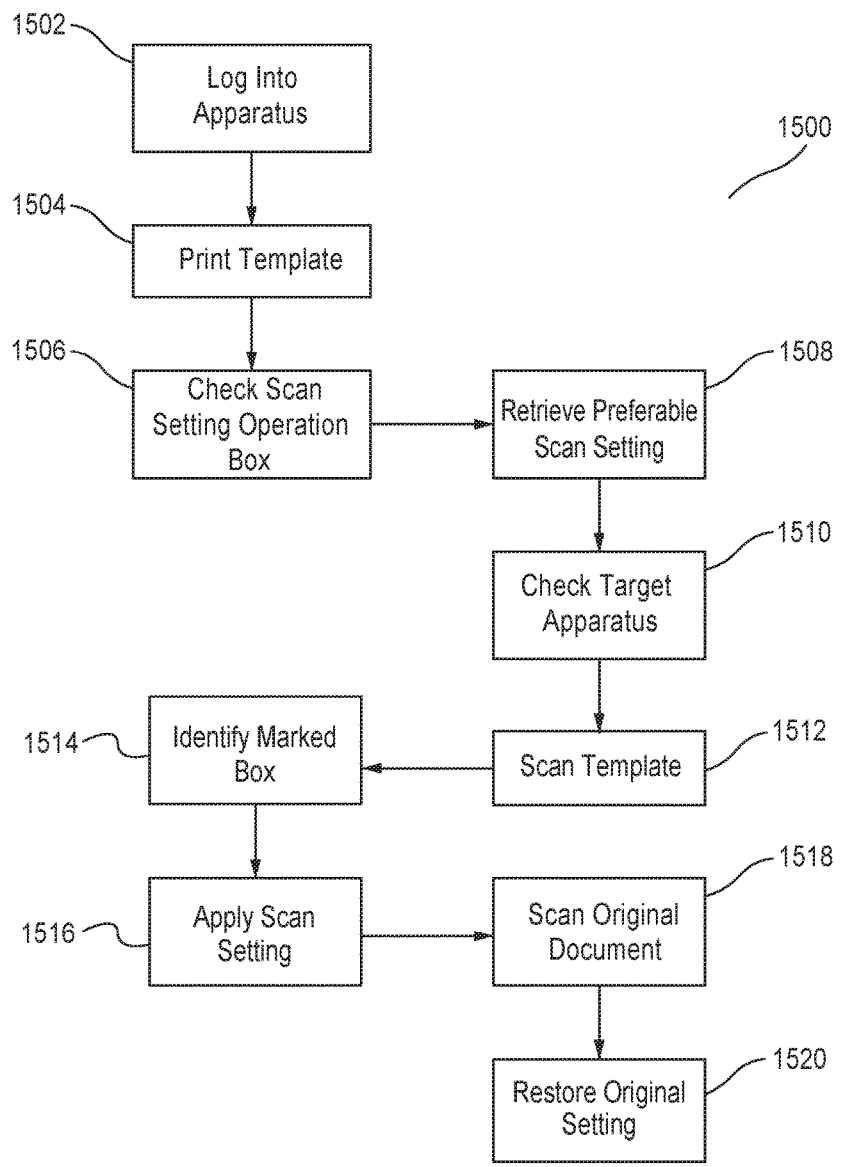
FIG. 15 illustrates a flowchart for configuring scan settings at an image forming apparatus according to the disclosed embodiments.

FIG. 15 illustrates a flowchart 1500 for configuring scan settings at an image forming apparatus 300 according to the disclosed embodiments. The user may wish to change scan settings at the image forming apparatus but is unsure how to do so using the operation panel 308 or a computer linked to the apparatus. The user may print a template sheet 400 and scan it to change the settings at the apparatus or at another apparatus on the network. This process reduces time and effort in changing scanning operations for one job or for a short period. Alternatively, the user may desire to change the scan settings at another image forming apparatus in a remote manner without having to carry or memorize the settings information.

Step 1502 executes by logging into image forming apparatus 300. The user may type in a code or identification to access the user's settings. Step 1504 executes by printing template sheet 400. Template sheet 400 includes graphical code 402 that indicates the storage location for the settings of the user. Step 1506 executes by checking a scan setting operation box of operation boxes 404.

Step 1508 executes by retrieving the preferable scan settings for the scan job. The user may enter the preferred scan setting on operation panel 308. Thus, in some embodiments, the settings information is entered on image forming apparatus 300 and not retrieved from a storage location address. In other embodiments, this step may be changed to retrieve preferred settings for the user. As disclosed above, graphical code 402 may direct image forming apparatus 300 to retrieve the settings information from a storage location address. The result of step 1508 is that settings are entered or retrieved on the apparatus. In some embodiments, the information for the settings entered includes a target image forming apparatus that differs from the present image forming apparatus receiving template sheet 400.

Step 1510 executes by checking the status of the target image forming apparatus. The disclosed process checks, or determines, that the target, or destination, image forming apparatus on the network is from those associated with the logged in user. In other words, the user may not change scan settings on a target image forming apparatus that he/she does not have authorization to use. This check prevents a user from intentionally or accidentally changing settings for an image forming apparatus. The entered identification may be checked against the identification stored for the user at a memory storage location address indicated by graphical code 402.

Step 1512 executes by scanning template sheet 400. The marked operation box 404 instructs image forming apparatus 300 to apply the entered scan settings to the target image forming apparatus. Step 1514 executes by identifying the marked operation box for the scan settings. As disclosed above, the disclosed embodiments determine whether the location corresponding to the operation box on the scanned template sheet is darkened. If so, then the operation box is identified as being "checked."

Step 1516 executes by applying the entered settings to the scanned document. As the electronic document resulting from the scan if configured, the image forming apparatus applies the settings to the electronic document. Preferably, the settings apply only to the immediate job following the scan of template sheet 400.

Step 1518 executes by scanning the original document that is part of the scan job. Scanner components 324 may be used in this operation. The scanning operation may occur at the target image forming apparatus. For example, the user may know that he/she will scan documents at the target apparatus. The user enters the scan settings in step 1508, which are then sent to the target apparatus. When the user arrives, the target apparatus scans the documents according to the settings.

Step 1520 executes by restoring the original settings to image forming apparatus 300. After the job is complete, the previous or default settings may be reinstated. The applied settings are not "permanent." In alternate embodiments, the applied settings may be used to scan documents on image forming apparatus 300 until instructed otherwise. The original settings of the image forming apparatus, however, should not be modified.

In some embodiments, step 1508 may not occur until after template sheet 400 is scanned in step 1512. In this instance, graphical code 402 includes information for the storage location address storing the settings information. The settings information is cloned to image forming apparatus 300. Graphical code 402 may not be made available to image forming apparatus 300 until it is scanned, especially if template sheet 400 is printed someplace else. In other embodiments, once the checked operation box is identified, the user may be prompted by instructions on operation panel 308 to enter the settings. This action may not occur until after the completed template sheet is scanned.

Figure 16:
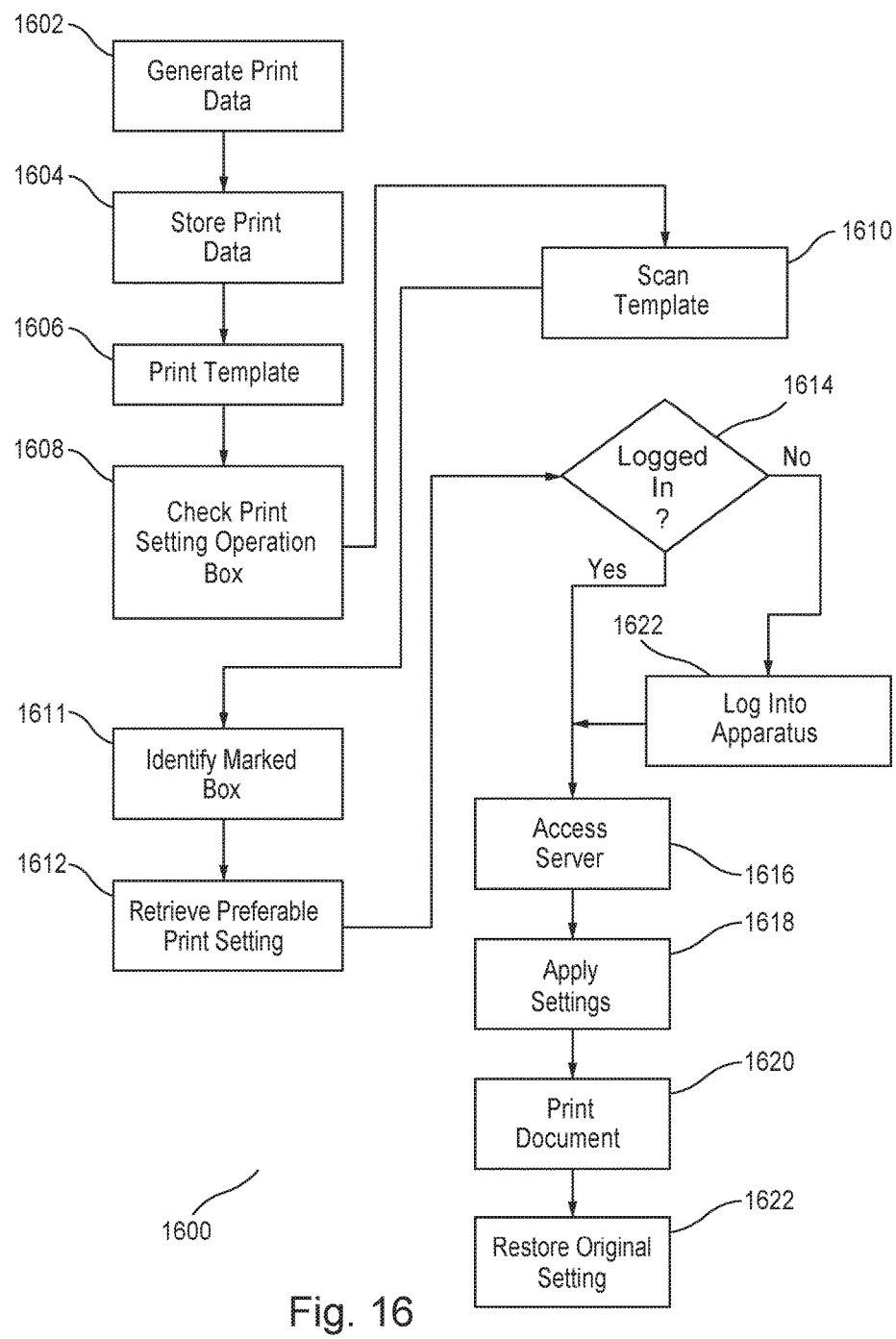
FIG. 16 illustrates a flowchart for configuring print settings at an image forming apparatus according to the disclosed embodiments.

FIG. 16 illustrates a flowchart 1600 for configuring print settings at an image forming apparatus 300 according to the disclosed embodiments. A user may wish to change print settings at the image forming apparatus but is unsure how to do so using the operation panel 308 or a computer linked to the apparatus. The user may print a template sheet 400 and scan it to change the settings at the apparatus or at another apparatus on the network. This process reduces time and effort in changing printing operations for one job or for a short period. Alternatively, the user may desire to change the print settings at another image forming apparatus in a remote manner without having to carry or memorize the settings information.

Step 1602 executes by generating print data. Print data, in this instance, may refer to data to be printed at an image forming apparatus 300 within a network. For example, print data may refer to an electronic version of a document, a spreadsheet, a picture, and the like. Step 1604 executes by storing the print data on server 202. Alternatively, the print data may be stored in a memory unit 306 in image forming apparatus 300. Thus, the document for printing is held in electronic form someplace accessible by image forming apparatus 300.

Step 1606 executes by printing template sheet 400. Template sheet 400 includes graphical code 402 that may indicate the storage location for the settings of the user. Other information may be included in graphical code 402. Step 1608 executes by checking a print setting operation box of operation boxes 404 of template sheet 400. Step 1610 executes by scanning template sheet 400, as disclosed above. Step 1611 executes by identifying that one or more operation boxes 404 are checked, or marked, using the processes disclosed above. The operation boxes may have specified locations on template sheet 400. Image forming apparatus 300 may determine what settings to retrieve based on the checked locations.

Step 1612 executes by retrieving the preferable print settings for the print operation(s). Thus, in some embodiments, the settings information is entered on image forming apparatus 300 and not retrieved from a storage location address. In other embodiments, this step may be changed to retrieve preferred settings for the user from a storage location address as indicated by graphical code 402. The result of step 1612 is that settings are entered or retrieved on the apparatus. In some embodiments, the information for the settings entered includes a target image forming apparatus that differs from the present image forming apparatus receiving template sheet 400. For example, the preferred settings may be to print on both sides of the papers for the print operation. The user enters settings to instruct image forming apparatus 300, or, in some instances, a target image forming apparatus.

Step 1614 executes by determining whether the user is logged into the target image forming apparatus to receive the settings. A user should be authorized to use an image forming apparatus prior to printing the documents. If step 1614 is yes, then step 1618 executes by accessing server 202 to retrieve print data, such as from storage locations 206. It also may prevent unauthorized access. Server 202 forwards the document data to image forming apparatus 300.

Step 1618 executes by applying the entered settings to the print operation being completed by the target image forming apparatus. Using the double sided example, the target apparatus will print the pages double-sided. Step 1620, therefore, executes by printing the document as instructed using the entered settings. The document is printed as instructed. Step 1622 executes by restoring image forming apparatus 300 back to its original settings. Preferably, the settings apply only to the immediate job following the scan of template sheet 400. After the job is complete, the previous or default settings may be reinstated. The original settings of the image forming apparatus should not be modified.

If step 1614 is no, then step 1622 executes by logging the user into image forming apparatus 300. The user may be prompted to enter identification information for the user. Having this information may be valuable in determining whether the user has access to a target apparatus. Further, the identification information may direct where to retrieve any information specific to the user.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more computer systems coupled to a network capable of exchanging information and data. These computer systems also may be general-purpose computer systems. Various functions and components of the computer system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for retrieving maintenance information about an image forming apparatus on a network, the method comprising:
    printing a template sheet for the image forming apparatus, wherein the template sheet includes a graphical code and a plurality of operation boxes related to a plurality of components within the image forming apparatus, and wherein the graphical code includes an identification information including a network address for the target image forming apparatus on the network;
    scanning the template sheet using a scanner at the image forming apparatus;
    identifying that at least one of the plurality of operation boxes is checked using a process on the image forming apparatus;
    determining that at least one component of the plurality of components that are checked on the image forming apparatus;
    retrieving maintenance information about the at least one component of the plurality of components within the image forming apparatus according to the graphical code and at least one of a checked operation box of the plurality of operation boxes by
    determining if a time is specified for an event one of the plurality of items within the image forming apparatus, and
    if the time is determined to be specified, retrieving the maintenance information related to the event within the specified time; and
    printing a maintenance report for the image forming apparatus, wherein the maintenance report includes the maintenance information.

2. The method of claim 1, further comprising:
    if the time is determined not be specified, determining if the maintenance report to be printed is a first maintenance report;
    if the maintenance report is determined to be the first maintenance report, determining if a predetermined time is set for the first maintenance report.

3. The method of claim 2, further comprising:
    if the predetermined time is determined to be set, retrieving the maintenance information related to the event within the predetermined time, and
    if the predetermined time is determined not to be set, retrieving the maintenance information related to the event from an installation of the image forming apparatus.

4. The method of claim 2, further comprising:
    if the maintenance report to be printed is not the first maintenance report, determining if a time for reporting is set;
        if the time for reporting is determined to be set, retrieving the maintenance information related to the event within the time for reporting; and
        if the time for reporting is determined not to be set, specifying the time for reporting, and
            retrieving the event information within the specified time for reporting.

5. The method of claim 1, wherein the graphical code is available for a predetermined period.

6. The method of claim 1, wherein the graphical code is available only once for the scanning step.

7. The method of claim 1, further comprising:
    storing the maintenance information at a storage location address associated with the graphical code on the network, wherein the storage location address is not located at the image forming apparatus.

* * * * *